United States Patent [19]

Martin et al.

[11] 3,990,559

[45] Nov. 9, 1976

[54] METHOD AND APPARATUS FOR MULTIPLE SPEED PRINT RATE CONTROL FOR DOT MATRIX PRINTER

[75] Inventors: Donald P. Martin, Chicago; Richard G. Ryan, Elmhurst, both of Ill.

[73] Assignee: Extel Corporation, Northbrook, Ill.

[22] Filed: Oct. 20, 1975

[21] Appl. No.: 624,054

[52] U.S. Cl. .............................. 197/1 R; 178/30; 101/93.05; 340/172.5
[51] Int. Cl.² .......................................... B41J 3/04
[58] Field of Search ......... 197/1 R; 178/23 R, 23 A, 178/24, 25, 26 R, 26 A, 30, 32; 340/172.5; 101/93.04, 93.05, 93.15; 197/49, 55, 82, 84 A; 235/61.9 R

[56] References Cited
UNITED STATES PATENTS

| | | | |
|---|---|---|---|
| 3,363,238 | 1/1968 | Clark et al. | 178/23 R |
| 3,444,319 | 5/1969 | Artzt et al. | 178/30 |
| 3,668,652 | 6/1972 | Zahn | 340/172.5 |
| 3,670,861 | 6/1972 | Zenner et al. | 197/1 R X |
| 3,703,949 | 11/1972 | Howard et al. | 197/1 R |
| 3,719,781 | 3/1973 | Fulton et al. | 178/30 |
| 3,938,641 | 2/1976 | Fulton | 197/1 R |

*Primary Examiner*—Ralph T. Rader
*Attorney, Agent, or Firm*—Kinzer, Plyer, Dorn & McEachran

[57] ABSTRACT

A method and apparatus for controlling the print rate of a column-sequential dot matrix printer actuated by an input signal comprising a sequence of code words occurring at a given maximum input rate, a print head and a print head drive operating at a speed determined by the frequency of a print rate timing signal, and a multi-stage FIFO input storage register. A multiplicity of constant-frequency print rate timing signals are generated, ranging in frequency from substantially below to substantially above a normal print rate frequency $F_n$ approximately matched to the input rate, and a variable print rate timing signal progressively increasing in frequency from well below $F_n$ to well above $F_n$ is also generated; these signals are applied to the printer in accordance with a predetermined schedule, determined by the number of code words in storage at the beginning of each spacing character cycle, and in accordance with a program affording relatively smooth acceleration and deceleration of the print head. In continuing operation, the number of code words in storage is accumulated to a given level and maintained approximately at that level until the input is interrupted.

14 Claims, 8 Drawing Figures

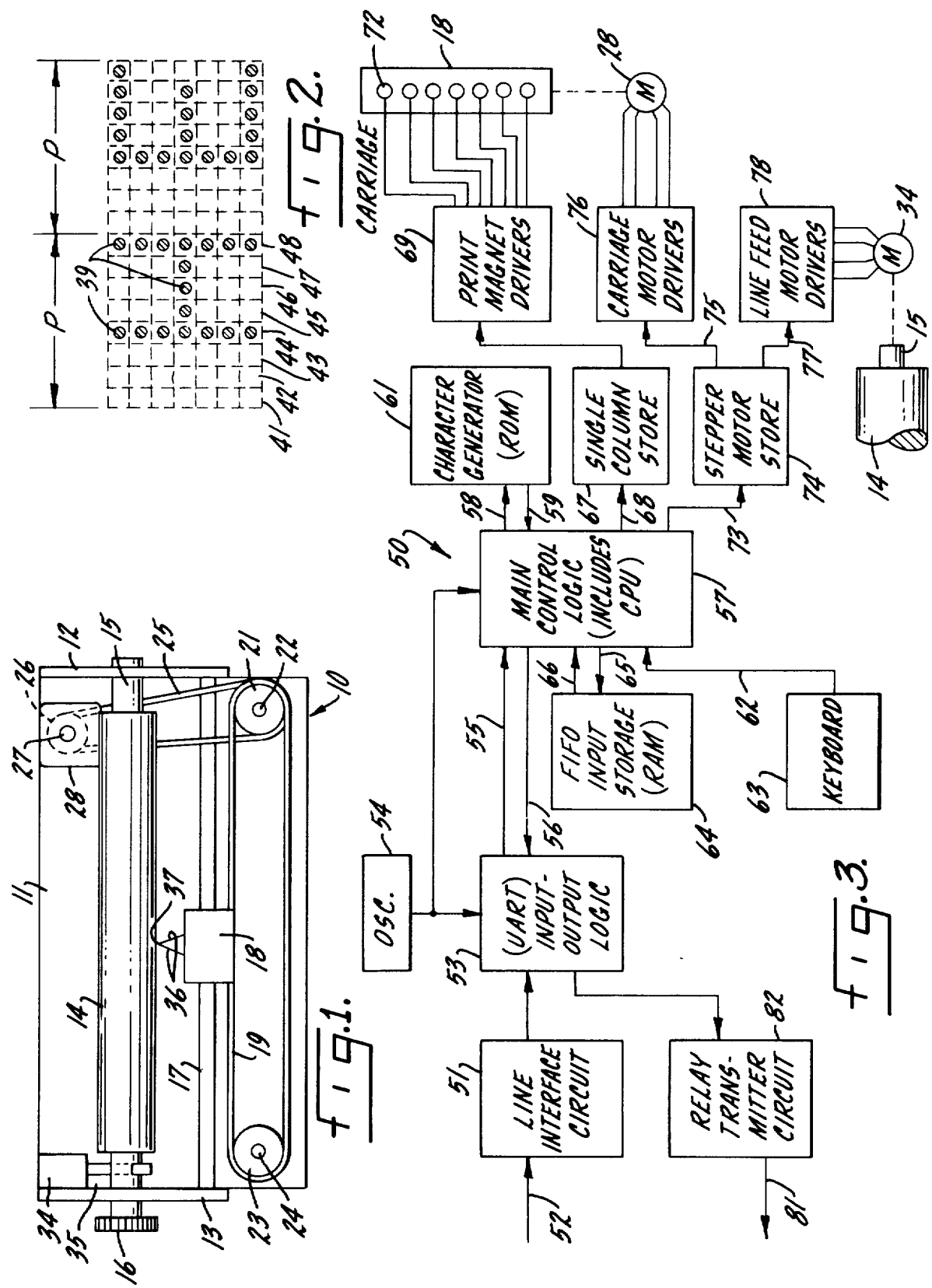

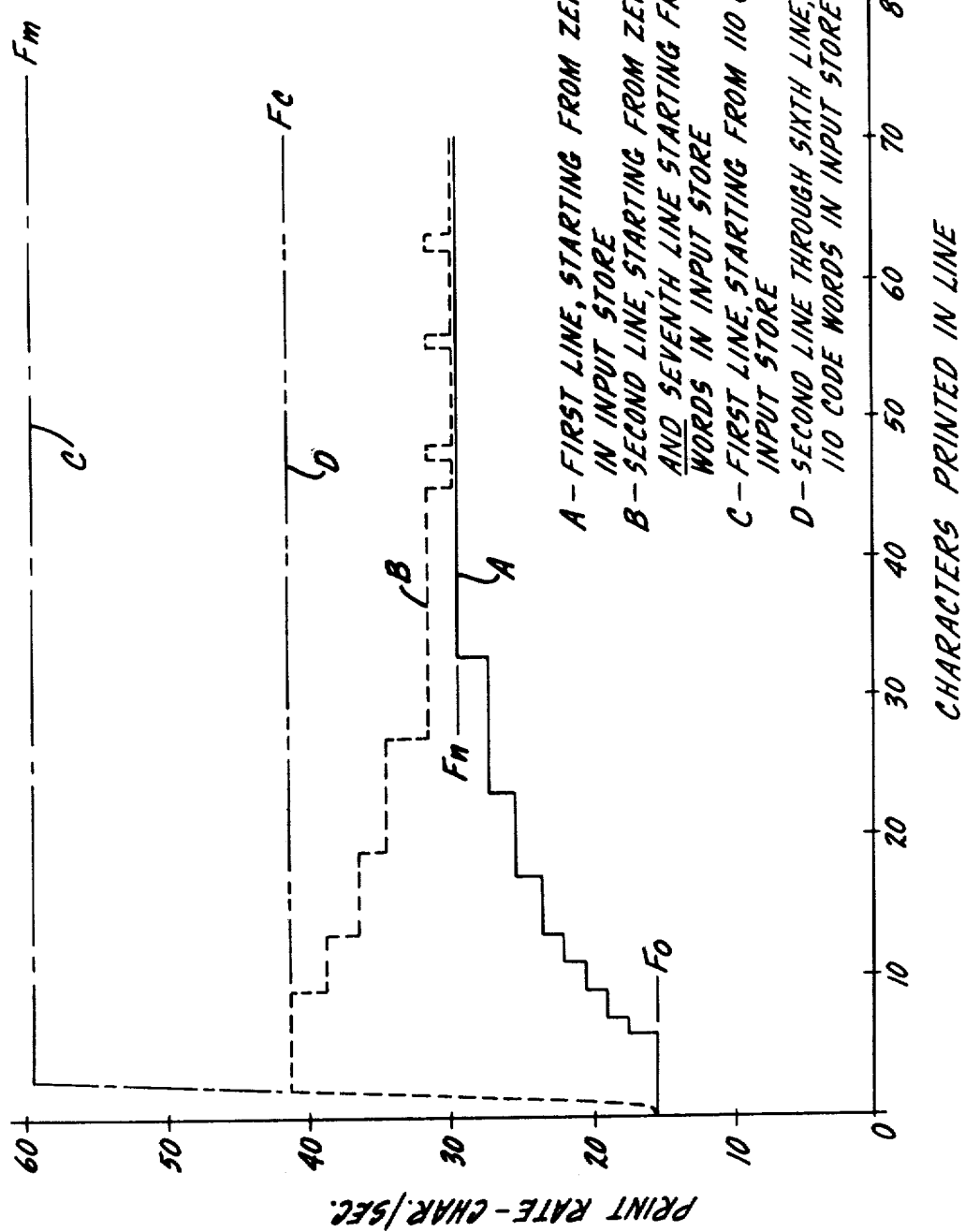

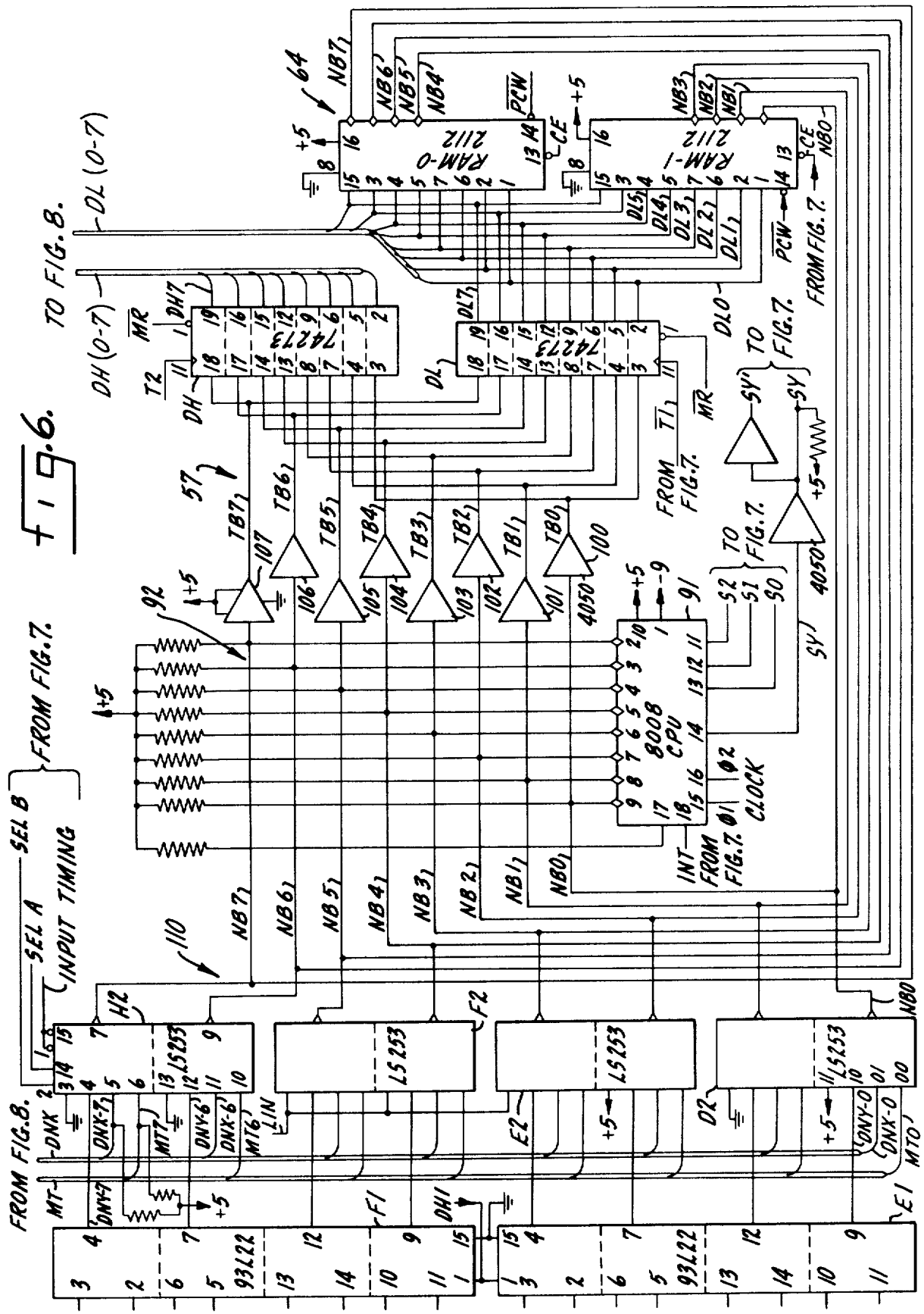

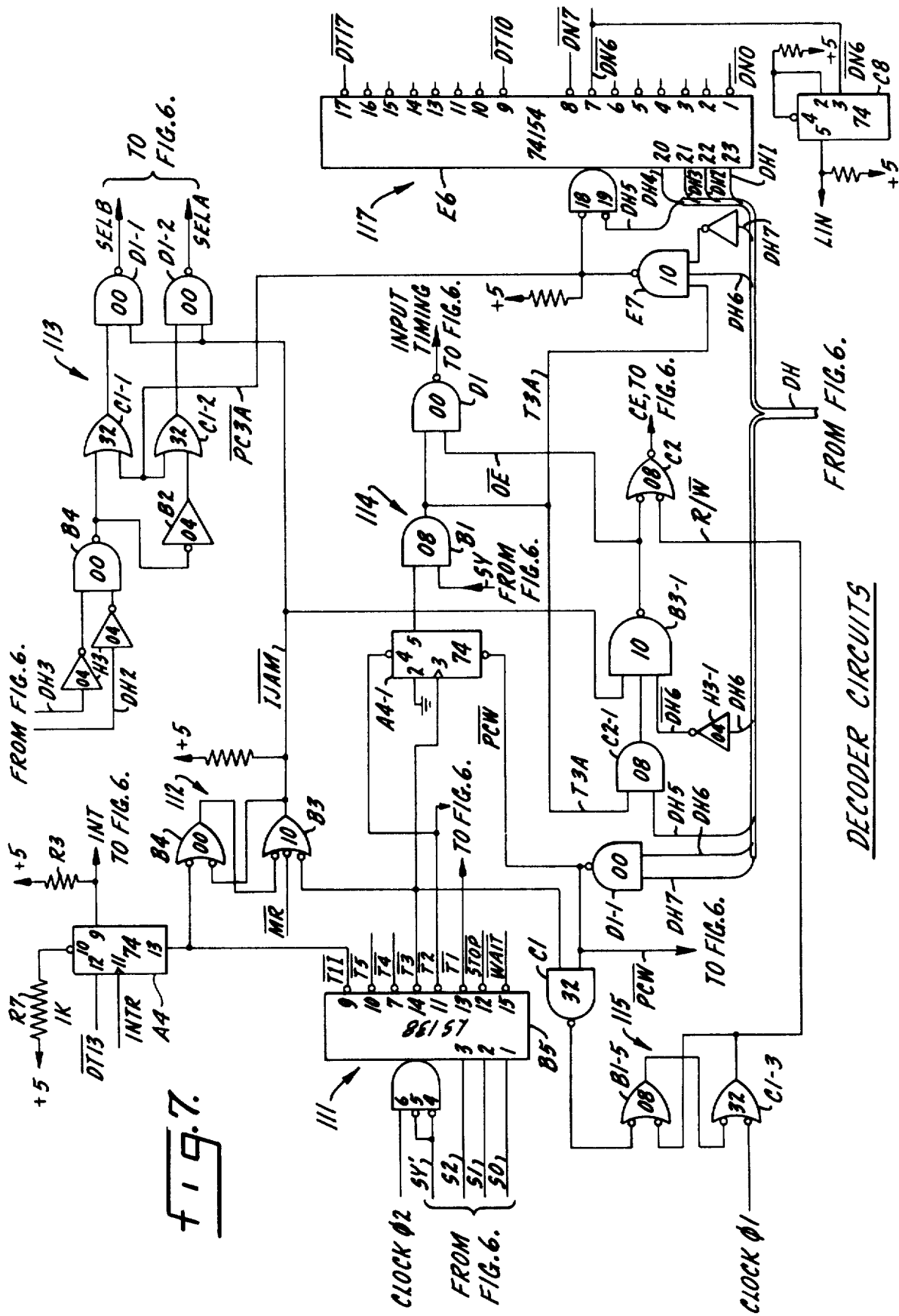

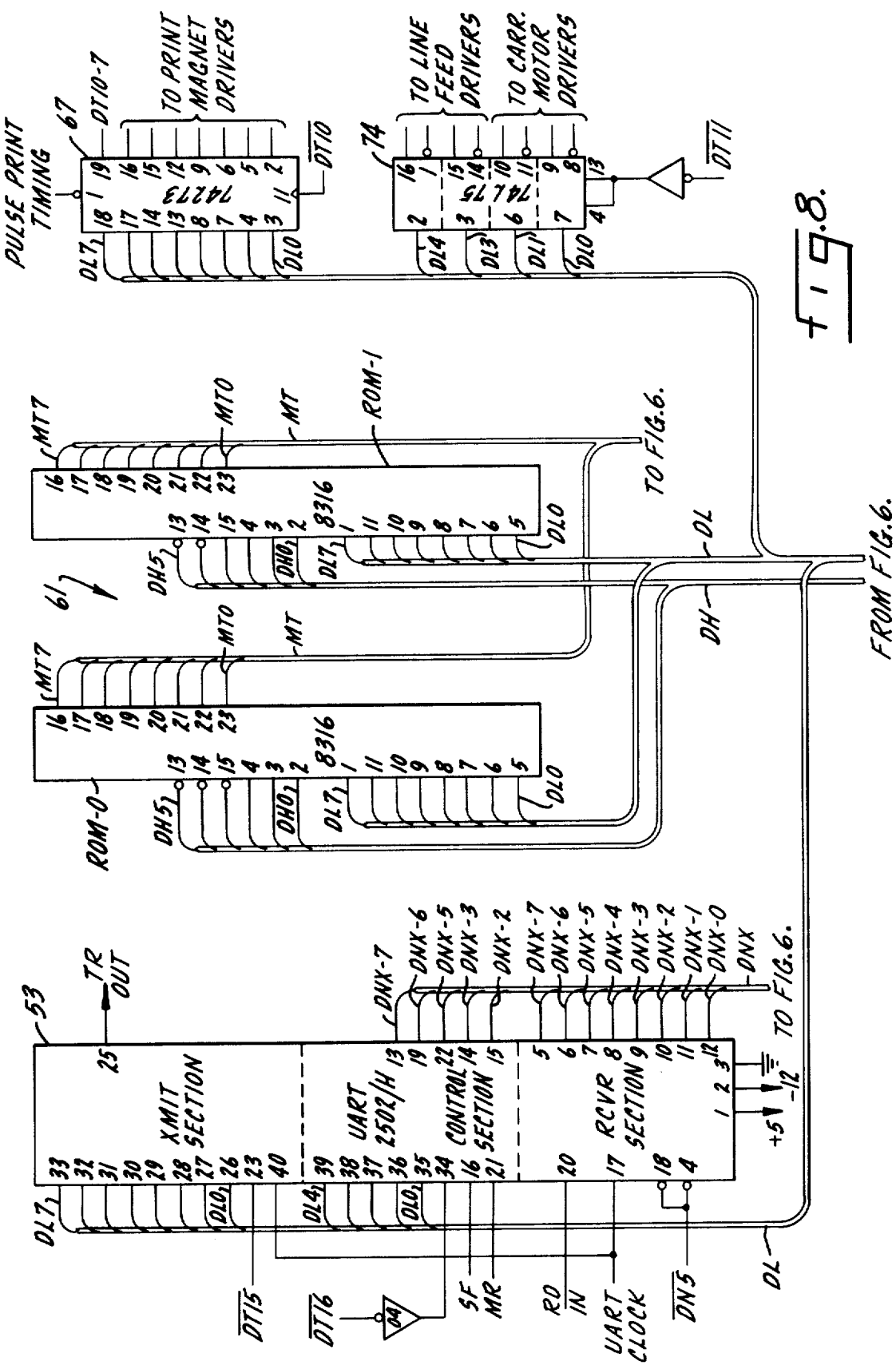

METHOD AND APPARATUS FOR MULTIPLE SPEED PRINT RATE CONTROL FOR DOT MATRIX PRINTER

Cross Reference to Related Applications and Patents

The invention covered by this application is an improvement in the print rate control systems described in two prior U.S. patent applications of John R. Fulton, Ser. No. 528,447, filed Nov. 29, 1974 now abandoned in favor of application Ser. No. 608,586, filed Aug. 28, 1975, and Ser. No. 575,270 filed May 7, 1975 now U.S. Pat. No. 3,938,641 issued Feb. 17, 1976. The invention is particularly applicable to a printer mechanism of the kind described in U.S. Pat. No. 3,670,861 of Walter J. Zenner and Raymond E. Kranz, dated June 20, 1972.

BACKGROUND OF THE INVENTION

In a column-sequential dot matrix printer, in which each character is reproduced by a series of sequentially printed columns of individual dots, with the print head advancing one step for each column, timing of the printer operations may be extremely critical. This is particularly true when the printer is operated at relatively high speeds, at which non-print functions of the mechanism, such as carriage return, line feed, tabulation, and other operations, require time intervals long enough to permit the accumulation of a number of new code words in the input storage for the printer. In one prior art print rate control system, which is particularly effective at moderate print rates, a two-speed arrangement is employed; a normal speed matched to the rate of incoming data is used when there is only one code word in the input register, and a slightly higher speed is employed when two or more code words are in storage. A system of this kind is disclosed in the aforementioned Fulton U.S. Pat. No. 3,938,641.

A more sophisticated and versatile print rate control system for a column-sequential dot matrix printer, which provides substantially improved operation at high speeds, is described in the above-mentioned Fulton application Ser. No. 608,586. In that system, the printing speed is controlled by at least three different print rate timing signals. One of these is a normal print rate signal of constant frequency that drives the print head at a speed essentially matched to the input rate of the data supplied to the printer. The second is a fast print rate timing signal of a substantially higher constant frequency. The third rate signal is of progressively increasing frequency, from an initial frequency substantially lower than the normal frequency to a final frequency at least as high as the normal frequency. The variable rate timing signal is used to accelerate the print head gradually to either the normal or the fast constant print rate, depending upon the number of code words in storage following each interval in which the print head has come to rest. When the printer is operating at the fast print rate and the number of code words in storage is reduced to a given level, the print head speed for succeeding cycles is dropped directly to the normal print rate.

Although the system of application Ser. No. 608,586 affords a substantial improvement in operation as compared to other prior print rate controls, including the system of U.S. Pat. No. 3,938,641, some difficulties and disadvantages are still experienced. Thus, it has been found that the system is not always sufficiently versatile in accelerating the print head at the beginning of a print line or in other circumstances in which the print head has been stopped. This difficulty is engendered by the fact that the maximum speed reached by the print head is the same for a wide variety of conditions ranging, for example, from two or three code words in storage to more than one hundred words in storage. If there are only a few words in storage, there is no necessity to accelerate the print head to an extremely high speed. On the other hand, if there is a really large number of code words in storage, the print head should be accelerated to a truly high speed, usually of the order of twice the normal print rate, in order to the printer to a reasonably current operating condition and avoid overrunning the capacity of the output storage register on a subsequent carriage return or like operation.

Known systems, if constructed to afford a fast operating speed that is substantially higher than the normal print rate, may permit unduly rapid deceleration of the print head when the number of code words in storage is reduced to the controlling level. This may result in a distortion of some of the printed characters, due to inertia of the printing mechanism. It may also produce undesirable wear characteristics, for the printing mechanism, over a long period of time, resulting from the abrupt changes that occur in the movement rate of the print head.

SUMMARY OF THE INVENTION

It is a principal object of the invention, therefore, to provide a new and improved print rate control system for a column-sequential dot matrix printer, which effectively provides for gradual acceleration of the print head, from rest, to any one of a large number of different initial printing speeds, depending upon the number of code words in storage at the time of initiation of each spacing character cycle; a "spacing character cycle" is defined as any cycle of operation of the printer in which the print head is stepped through a plurality of individual column positions, regardless of whether printing is actually effected during the cycle.

A more specific object of the invention is to provide a new and improved method and apparatus for controlling the print rate of a column-sequential dot matrix printer, over a large number of print rates ranging substantially above and substantially below a normal print rate approximately matched to the input rate of data to the printer, with the print rate during any spacing character cycle being determined primarily by the number of code words in storage at the beginning of that particular cycle, but with provision for variation of the print rate in accordance with other factors including he number of code words in storage at the beginning of a print line.

Another object of the invention is to provide a new and improved print rate control system for a column-sequential dot matrix printer that affords gradual deceleration of the print head from any print rate substantially in excess of a normal print rate approximately matched to the rate of data input to the printer, as the number of code words in storage is reduced.

A further object of the invention is to provide a new and improved method and apparatus for controlling the print rate of a high speed column-sequential dot matrix printer to afford smooth continuing operation, including the build-up and maintenance of a limited number of code words in the input storage to the printer.

Accordingly, the invention relates to a method of controlling the print rate of a high speed column-sequential dot matrix printer actuated by an input signal comprising a sequence of code words occurring at a given maximum input rate, the printer comprising a print head, a print head drive for moving the print head through a number of column steps in a spacing character cycle at a speed controlled by a print rate timing signal, and a multi-stage FIFO input storage register, each stage capable of storing a complete code word. The method comprises the following steps:

monitoring the input storage register to determine the number $\underline{N}$ of code words in storage;

providing a multiplicity of print rate timing signals in discrete steps of increasingly higher frequency $\underline{F}$ from a low frequency $\underline{Fo}$ through a normal frequency $\underline{Fn}$ to a maximum Fm, where $\underline{Fo} < \underline{Fn} < $ Fm, the print rate timing signal at frequency $\underline{Fn}$ being effective to actuate the print head drive at a column rate which reproduces normal spacing characters at a rate approximately matched to the code work input rate;

and selectively applying the print timing signals to the printer, in each spacing character cycle, in accordance with a predetermined schedule correlating each pring rate timing frequency with a given number of code words in storage at the beginning of the spacing character cycle.

Further, the invention relates to a control system for controlling the print rate of a printer as described in the preceding paragraph. The control system comprises: clock means for generating a plurality of print rate timing signals of different constant frequency ranging from a low frequency $\underline{Fo}$ through a normal frequency Fn to a maximum frequency Fm, where $\underline{Fo} < \underline{Fn} < \underline{Fm}$, and where the normal print rate timing signal of frequency $\underline{Fn}$ actuates the print head drive at a column rate which reproduces normal spacing characters at a rate approximately matched to the code word input rate; monitoring means, coupled to the input storage register, for detecting the number of code words in storage; and selector logic means for selectively applying the print rate timing signals to the printer to control the rate of reproduction of spacing characters in accordance with a predetermined schedule correlating each print rate timing signal frequency with a given number of code words in storage at the beginning of each spacing character cycle.

BRIEF DESCRIPTION OF THE DRAWINGS

FIG. 1 is a simplified plan view of a high-speed column-sequential dot matrix printer of the general kind to which the print rate control method and apparatus of the present invention may be applied;

FIG. 2 illustrates the form of the characters printed by the printer of FIG. 1;

FIG. 3 is a simplified block diagram of the overall control system for the printer of FIG. 1, in which the improvements of the present invention may be incorporated;

FIG. 4 is a chart illustrating the print rate for various operating conditions of the printer, utilizing one embodiment of the method and apparatus of the present invention;

FIG. 6 is a circuit diagram illustrating principal components of the main control logic and also illustrating the storage register for one embodiment of the invention;

FIG. 7 is a circuit diagram for the remainder of the main control logic shown in FIG. 6; and FIG. 8 is a circuit diagram of the UART circuit and the character generator for the embodiment of FIGS. 6 and 7.

DESCRIPTION OF THE PREFERRED EMBODIMENT

The Basic Printer

Figure 5:
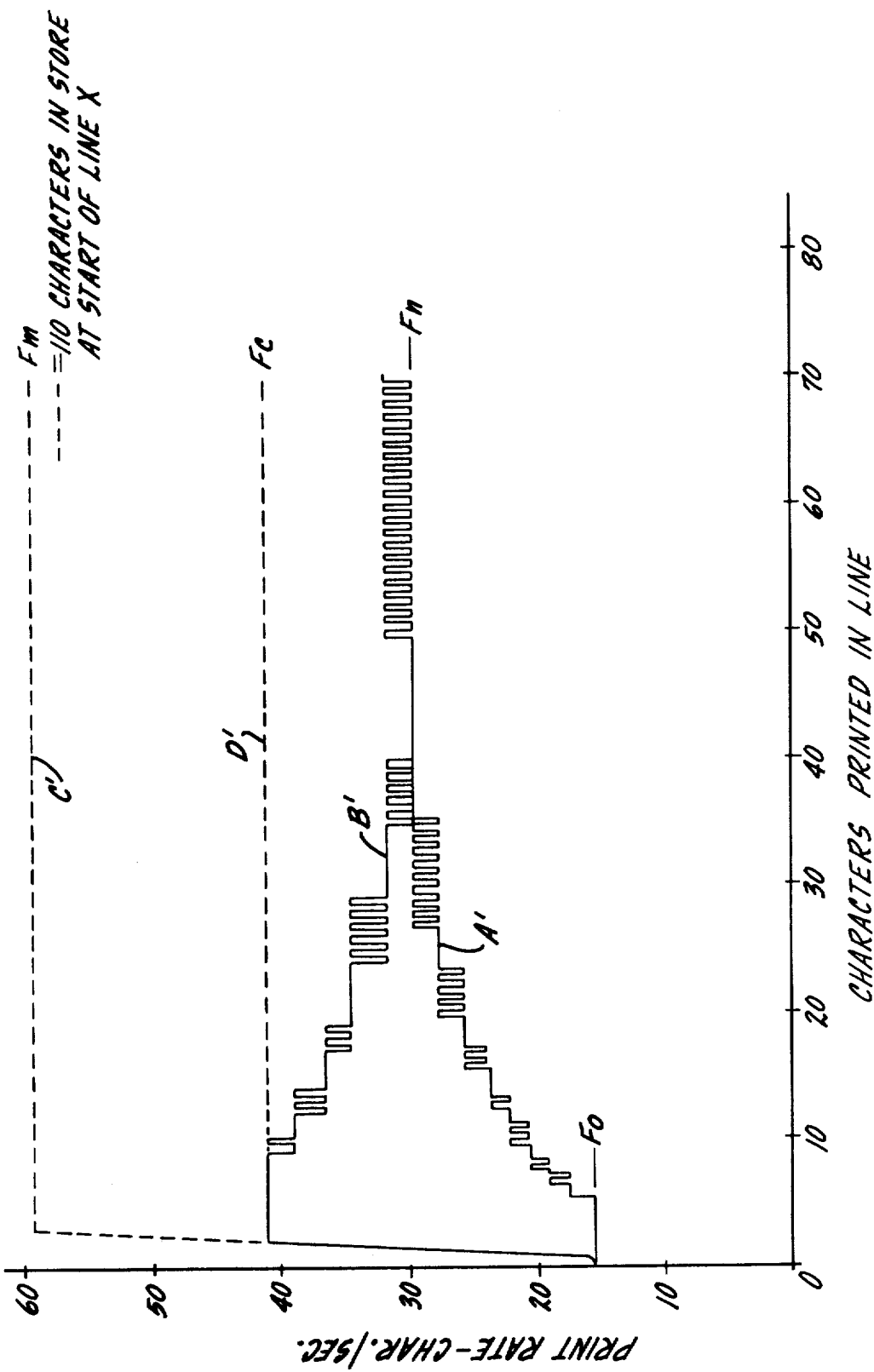
FIG. 5 is a print rate chart, similar to FIG. 4, for another embodiment of the invention.

FIG. 1 illustrates, in simplified form, a high speed column-sequential dot matrix printer 10 in which the print rate control method and apparatus of the present invention may be employed; printer 10 produces characters in the form shown in FIG. 2. Printer 10 comprises a base 11 including two vertical side frame members 12 and 13. A platen 14 is mounted upon a rotatable shaft 15 that extends between frame members 12 and 13. A knob 16 is mounted on one end of shaft 15 to provide for manual rotation of the platen.

A carriage guide rail 17 extends across the front of printer 10, parallel to platen 14, between frame members 12 and 13. A carriage 18 is slidably mounted on guide rail 17 and is connected to a carriage positioning belt 19. Preferably, belt 19 is a toothed belt of the kind known as a timing belt. Belt 19 extends around a drive sprocket 21 mounted upon a shaft 22 that projects upwardly from the right-hand side of base 11 and also engages an idler sprocket 23 mounted upon a vertical shaft 24 at the left-hand side of the printer.

Shaft 22 is connected to a pulley, not shown, that is engaged by a drive belt 25. The drive belt 25 extends around a drive sprocket 26 mounted upon the shaft 27 of a stepping motor 28. Motor 28 is a reversible motor that rotates through a discrete angle of rotation each time an electrical signal pulse is applied to the windings of the motor.

Printer 10 also includes a line feed actuator 34 mounted in the rear left-hand corner of the printer on base 11. Actuator 34, which may comprise a solenoid or a stepping motor, is connected to a line feed linkage 35 for rotating platen 14 to effect a line feed operation. In operation, a sheet or web or paper extends around platen 14 and is imprinted by a plurality of print rods 36 that extend from carriage 18 toward platen 14. In a typical printer, there are seven print rods 36 arranged in vertical alignment with each other at the printing station 37 adjacent the surface of platen 14, each provided with an individual drive magnet (not shown). Thermal print elements or other print elements can be utilized instead of the print rods 36 is desired.

Printer 10 is, essentially, a simplified illustration of the high speed printer described and claimed in U.S. Pat. No. 3,670,861 of Walter J. Zenner and Raymond E. Kranz, issued June 20, 1972, to which reference may be made for a more complete and comprehensive description of the mechanical construction and operation of the printer. Details of some of the mechanical linkages in the printer, such as a return spring for return of carriage 18 to the left-hand margin and a clutch to release the carriage drive for return movement, have been omitted as unnecessary for an understanding of the present invention. The preferred construction for carriage 18, including print rods 36 and the print rod magnets, is described and illustrated in detail in U.S. Pat. No. 3,729,079 of Messrs. Zenner and Kranz, issued Apr. 24, 1973. Only a brief description of the mechanical operation of printer 10 is necessary in this specification.

In the operation of printer 10, as noted above, a sheet or web of impact-sensitive paper is extended around platen 14, between the platen and the print rods 36 of the printer. If preferred, ordinary paper and a carbon ribbon or carbon sheet can be employed; thermosensitive paper is employed in printers using thermal print elements. The starting position for carriage 18 is at the left-hand end of its travel on guide 17. For the first character to be imprinted, such as the character H illustrated in FIG. 2, carriage 18 advances P discrete steps from left to right, the carriage being driven by positioning belt 19 through the drive afforded by stepping motor 28, drive belt 25, and sprocket 21; in the illustrated embodiment, P = 8. During the first three steps or column movements of carriage 18, no impression is made on the paper. In the next five steps of the carriage, the complete character is imprinted by selective actuation of rods 36.

As shown in FIG. 2, the initial advancing movement of carriage 18 leaves three blank columns 41, 42 and 43 preceding the first character to be imprinted. In the first character column 44, all seven of the print rods 36 are driven into impact with the paper, producing seven vertical dot impressions 39. On each of the next imcremental step in the advancing movement of carriage 18, columns 45-47, only one dot impression 39 is formed, at the fourth or center level. In the eighth step of carriage 18, all seven of the print rods 36 are again actuated, producing seven dot impressions 39 in the final column 48. This results in formation of the letter H as illustrated in FIG. 2. In this same manner, a complete line of characters is imprinted across the paper on platen 14, with carriage 18 moving from left to right a total of eight steps for each ordinary alphanumeric character. The number of steps (P) can be varied for special characters (fractions, weather symbols, etc.).

When a complete line of characters has been printed (the line length may vary substantially), a carriage return mechanism (not shown) is actuated to return carriage 18 to the left-hand side of printer 10 and initiate printing of a new line. Before a new line of print is initiated, the line feed actuator 34 rotates platen 14 to align a fresh line segment of the paper web with carriage 18. The carriage return operation may be actuated by reverse rotation of motor 28 through a discrete number of steps, as in the carriage drive described in the aforementioned Zenner and Kranz U.S. Pat. No. 3,670,861. Ordinarily, the carriage return operation is initiated by a carriage return function code incorporated in a telegraph signal that controls printer 10. On the otherhand, if the telegraph signal does not include suitable carriage return codes, other carriage return controls may be employed.

The Printer Control System

FIG. 3 illustrates, in block diagram form, a general printer control system 50 in which the present invention may be utilized. The transmission line input stage of system 50 is a line interface circuit 51 to which a telegraph input signal is supplied on line 52. The input signal may be encoded in accordance with the standard eleven-unit ASCII code or the conventional seven and one-half unit Baudot code; other permutation codes can be employed with appropriate modifications in the control system to interpret the code.

The output of line relay 51 is connected to a universal asynchronous receive/transmit (UART) input-output logic circuit 53. For example, UART circuit 53 may comprise a MOS/LSI unit as manufactured by SMC Microsystems Corporation, Model COM2502/H or COM2017/H, suitable programmed for data word length, parity mode and number of stop bits to conform to the requirements of the data input signal supplied from line 52 through interface circuit 51. A basic timing signal is supplied to the UART circuit 53 from an oscillator 54. Circuit 54 may comprise a start-stop multivibrator or other oscillator of constant frequency, usually a crystal-controlled oscillator. A typical operating frequency for oscillator 54 is ten megahertz, with appropriate countdown circuits to derive the operating frequencies required for the printer timing control.

The UART device 53 has a data output connection 55 to a main control logic unit 57; there is also a control output 56 from the main control logic unit back to UART device 53. The main control logic unit 57 can be constructed as a TTL circuit, using individual gates, latches, and like circuit elements. Preferably, however, unit 57 comprises a miniprocessor or microcomputer, with suitable auxiliary circuits such as an input multiplexer and output registers, programmed to carry out the print rate control operations of the present invention as well as the many other functions necessary to control printer 10. A basic program for control of printer 10, using one commercially available minicomputer in logic unit 57, is set forth hereinafter.

The main logic unit 57 has output and input connections 58 and 59 to a character generator 61. Character generator 61 may be of conventional construction; for example, the character generator may comprise two type 8316 read-only memory (ROM) devices programmed in accordance with the desired type font and input data code. There is also a local data input circuit 62 to logic unit 57, from a keyboard 63, for local operation of printer 10 and for transmission-mode operation of the printer.

Control system 50 includes a first-in first-out (FIFO) input storage register 64. Storage register 64 has an input connection 65 from logic unit 57 and an output circuit 66 back to the main logic unit. A conventional shift register may be employed for device 64; as illustrated, however, storage register 64 is a random access memory (RAM) programmed for FIFO operation. By way of example, storage register 64 may comprise two type 2112 RAM devices (see FIG. 6).

The main logic unit 57 has an output 68 to a single-column storage register 67 in turn connected to print magnet driver circuits 69. Store 67 affords seven output circuits, one for each of the printing rods 36 of printer 10 (FIG. 1); each output is individually connected to one of seven print magnet driver circuits in unit 69. Each print magnet driver circuit is connected to an individual magnet or solenoid 72 for actuating one of the print rods 36 (see FIG. 1).

Another output 73 from the main control logic unit 57 extends to a stepper motor store 73. The store 74 includes a carriage motor storage register connected by an output 75 to a carriage motor driver unit 76 and a line feed storage register connected by an output 77 to a line feed motor drive unit 78. The carriage motor driver unit 76 has four outputs individually connected to four motor windings in the carriage drive step motor 28. Signals from driver unit 76 to motor 28 determine the direction of rotation of the motor and control the number of steps through which the carriage drive motor is driven in any given operational sequence. Similarly, four outputs from the line feed motor driver unit 78 to line feed motor 34 supply actuating signals to the line feed motor to drive shaft 15 and platen 14 through any required line feed or other operations requiring platen rotation.

In considering the general operation of control system 50, it may first be assumed that printer 10 is being operated as a receiver responsive to an input signal supplied to the UART circuit 53 from line 52 through interface circuit 51. In the UART circuit, each received code word is converted from series to parallel form and transmitted to the main control logic unit 57 as generally indicated by line 55. The overall synchronization of operations in control system 50 is effected by clock signals from oscillator 54.

The main logic control unit 57 records the received data in the input storage register 64. The recorded code words are read from RAM 64 by the main control logic unit 57 and supplied to character generator 61, which interprets each code word with respect to machine function and supplies machine control signals back to the main control logic unit. ROM 61 may also store the program for logic unit 57, when the logic unit comprises a miniprocessor or like CPU. For the printing of any individual character, print magnet control signals based on the signals from character generator 61 are supplied by the main control logic 57 to store 67, in the appropriate sequence, and then applied to the print magnet drivers 69 for selective energization of the print magnets 72. Stepping of the print head 18 through the required sequence of column steps for reproduction of each character is effected by stepping signals supplied to store 74 from logic unit 57 and applied to motor 28 through the carriage motor driver unit 76.

Whenever a carriage return code word is read from RAM 64 and decoded in character generator 61, appropriate signals are supplied from ROM 61 through control logic 57 to store 74 and then to carriage motor driver unit 76 to actuate motor 28 through the requisite number of steps, in a reverse direction, to effect a carriage return operation. If the printer affords carriage return means actuated other than by reverse operation of motor 28, it is a relatively simple matter to revise control system 50 accordingly. The same procedure is followed for a line feed code as for a carriage return; motor drive unit 78 is actuated and energizes motor 34 for a line feed operation. It will be recognized that other non-print functions for printer 10, including such operations as tabulation movements, momentary advance and retraction of the platen for last-character viewing, and the like, may be incorporated in control system 50 in the same manner.

For operation of printer 10 as a transmitter, an input signal is supplied from keyboard 63 to the main control logic unit 57. Operation of the printer proceeds in the same manner as described above: the code words of the input signal are recorded sequentially in RAM 64 and read out in the same sequence for printer actuation. The signals from keyboard 63 are also supplied from logic unit 57 to UART 53 and from UART 53 to a transmission line 81 through a relay transmitter circuit 82.

The Method of the Invention

In controlling the print rate for the column-sequential dot matrix printer 10, utilizing the method of the present invention, the input storage register (RAM 64 in control system 50) is monitored to determine the number $N$ of code words in storage. In system 50, the count of the number of code words in storage is maintained in the main control logic unit 57.

It is also necessary, in carrying out the control method of the invention, to provide a multiplicity of print rate timing signals in discrete steps of increasingly higher frequency $F$. The print rate timing signal frequencies range from a low frequency $Fo$ through a normal frequency $Fn$ to a maximum frequency $Fm$, with $Fo < Fn < Fm$. The print rate timing signal frequency $Fn$ is selected as a frequency which is effective to actuate the print head drive for the printer at a column rate which reproduces normal spacing characters at a rate approximately matched to the code word input rate. Thus, for a printer intended to reproduce an input signal comprising a sequence of code words recurring at a maximum input rate of thirty code words per second, sometimes expressed as thirty characters per second, utilizing a normal spacing character format of eight columns (FIG. 2), the normal print rate timing signal frequency Fn should be approximately 240 Hz. Some limited variation from this frequency can be permitted.

The low frequency $Fo$ and the maximum frequency $Fm$ for the print rate timing signals are selected in accordance with the mechanical requirements of the particular printer mechanism employed. In general, the maximum print rate timing frequency $Fm$ may be approximately twice the normal timing frequency $Fn$ and the low print rate timing signal frequency $Fo$ may be approximately one-half the normal frequency $Fn$. These limiting values, however, are subject to considerable variation, depending upon the inertia characteristics and other operating characteristics of the printer mechanism. The number of discrete steps of different frequencies for the print rate timing signals is also somewhat a matter of design choice, and again depends upon the inertia and other characteristics of the printer mechanism. However, a substantial number of different print rate timing signal frequencies should be employed in order to obtain the full benefits of the present invention; in the specific example set forth hereinafter a total of 20 discrete frequency steps are provided.

The print rate timing signals, which constitute the solumn step signals supplied to the carriage drive motor 28 from circuits 74 and 76 and also control the energization of print magnets 72, in the system illustrated in FIG. 3, may be generated most effectively by appropriate count-down circuits coupled to the main control oscillator 54. Further, these count-down functions may be performed in a microprocessor in the main control logic unit 57. The method of the present invention includes the establishment of a schedule correlating each print rate timing frequency, from $Fo$ to $Fm$, with a given number of code words in storage in the input register of the control system. This is not necessarily a complete one-for-one correlation; a given print rate timing frequency may correlate with two or even more different numbers of code words in storage in the input register. This is particularly true for the lower print rate timing frequencies. A typical schedule of correlation of print rate timing frequencies $F$ to numbers $N$ of code words in storage, for a printer intended to utilize an input signal comprising a sequence of code words occurring at a maximum input rate of thirty characters per second, is:

TABLE 1

Schedule of Correlation, Print Rate to Number of Code Words in Storage

| Code Words in Store (N) | Print Rate Char/Sec. (F/8) | Print Rate Col./Sec. (F) | Normal 8-Col. Character Period (Sec.) | Column Step Period (Sec.) |
|---|---|---|---|---|
| 1  | 15.7     | 125.6         | 0.0637 | 0.0079 |
| 2  | 15.7     | 125.6         | .0637  | .0079  |
| 3  | 15.7     | 125.6         | .0637  | .0079  |
| 4 = No | 15.7 | 125.6 = Fo    | .0637  | .0079  |
| 5  | 17.3     | 138.4         | .0578  | .0072  |
| 6  | 18.9     | 151.2         | .0529  | .0066  |
| 7  | 20.5     | 164.0         | .0488  | .0061  |
| 8  | 22.0     | 176.0         | .0455  | .0057  |
| 9  | 23.7     | 189.6         | .0422  | .0053  |
| 10 | 25.7     | 205.6         | .0389  | .0049  |
| 11 | 27.4     | 219.2         | .0365  | .0046  |
| 12 = Nn | 29.4  | 235.2 = Fn    | .0340  | .0043  |
| 13 | 31.7     |               | .0315  | .0039  |
| 14 | 34.3     |               | .0292  | .0036  |
| 15 | 36.4     |               | .0275  | .0034  |
| 16 | 38.7     |               | .0258  | .0032  |
| 17 | 41.3 (1) | 330.4 = Fc    | .0242  | .0030  |
| 18 | 44.3     | 354.4         | .0226  | .0028  |
| 19 | 47.8     |               | .0209  | .0026  |
| 20 | 51.8     |               | .0193  | .0024  |
| 21 | 54.1     |               | .0185  | .0023  |
| 22 | 56.6     |               | .0177  | .0022  |
| 23 | 59.4 (2) | 475.2 = Fm    | .0168  | .0021  |

(1) Acceleration interrupted at this print rate for all operations except when $N > Ne$ at start of line; $Ne = 100$ (2) Maximum print rate In the basic method of the invention, selection of the print rate timing signal to step the print head carriage through its individual column movements, in the reproduction of each spacing character, is effected in accordance with the schedule correlating the print rate timing frequency to the number $N$ of code words in storage, such as the schedule of Table I, utilizing the number of code words in storage at the beginning of the spacing character cycle of the printer as the determining factor in selection of the print rate timing frequency. Implementation of print rate timing control in accordance with the schedule of Table I can be effected by individual conventional logic circuits, as in a TTL control circuit arrangement. However, because a large number of selections may be required, and because it is usually desirable to modify the control schedule in accordance with other factors, it is preferred to implement the control schedule by programming of a microprocessor or similar CPU in order to reduce both the cost and the size of the main control logic which performs these basic functions.

The inertia of the print head carriage 18 makes it most undesirable to attempt to reproduce the first character in a new line at the print rate set forth in the correlation schedule, Table I, when there are a substantial number of code words in storage. The same consideration applies whenever the print head starts a new line or otherwise starts from a rest condition; any reference to the start of a line in this specification is intended to refer also to other operating conditions in which the print head starts from rest, as when printing has been interrupted for any reason in the middle of a line.

In order to avoid distortion in the reproduced characters that would otherwise result from the mechanical inertia of the printer, a gradual acceleration of the print head is effected whenever the print head carriage 18 starts a new line. Thus, whenever the number $N$ of code words in storage at the beginning of a spacing character cycle exceeds a given minimum number No and the print head has been at rest, print rate timing signals of progressively increasing frequency are applied to the printer for successive columns during that spacing character cycle. This acceleration mode of operation may be continued through two or three spacing character cycles, depending upon the number $N$ of code words in storage when a new line is initiated. Furthermore, the same acceleration technique is applied in any instance in which the frequency of the print rate timing signal for a column immediately preceding the start of a new spacing character was at least two steps below the schedule frequency for the number of code words presently in storage. This acceleration method reduces distortion in the reproduced characters to a minimum and permits the use of the printer at much higher printing rates than would otherwise be possible.

In more conventional print rate control techniques, as applied to column sequential dot matrix printers, it has been customary to regulate the print rate to limit the number $N$ of code words in storage to as low a value as possible. Thus, previously known control methods entail maintenance of a print rate in excess of the data input rate whenever as many as two code words are in storage, thereby endeavoring to operate the printer to reproduce each input character virtually as fast as received.

In the method of the present invention, a different procedure is followed; the number $Nn$ of code words in storage that is correlated with the normal print rate timing signal frequency $Fn$ is selected to represent a substantial quantity of code words in storage. In the specific schedule set forth in Table I, this number Nn is 12. With this arrangement, at least 12 code words can be maintained in storage during any extended operation of the printer with a continuous input signal. This affords a more even rate of operation, for extended messages, resulting in less stress on the printer mechanism than with previously known techniques.

As indicated by Table I, acceleration of the print head is interrupted at a print rate frequency $Fc$ for all operations except when the number of code words in storage exceeds a given excessive number $Ne$ at the start of a new line; in this instance $Ne = 100$. In the illustrated schedule $Fc$ is 330.4 Hz corresponding to a print rate of 41.3 characters per second. The selection of the cut-off frequency $Fc$ is not critical; essentially, the selected print rate for the cut-off frequency $Fc$ is a rate that is substantially higher than the normal print rate frequency $Fn$ but still well below the maximum print rate frequency $Fm$.

Furthermore, the choice of the particular excessive number $Ne$ above which the limitation to the cut-off frequency $Fc$ is no longer effected is also subject to substantial variation. The particular input storage register with which the schedule of Table I is intended to be used has a capacity of 128 code words. Thus, whenever the number of code words in storage exceeds one hundred, the printer is nearing the overall available input storage capacity and it is desirable to operate the printer at the highest possible speed in order to avoid a loss of data. If the capacity of the input storage register were doubled, the excessive level $Ne$ could be increased materially, perhaps to 150 or even to 200, taking into account also the number of characters that the printer can reproduce, above those supplied anew by the input signal, during a given line of operation. Whenever the number $N$ of code words in storage exceeds $Ne$, the print head is accelerated all the way to the maximum print rate frequency $Fm$.

Of course, conditions may arise in which the print head may require gradual acceleration by a column-by-column increase in the print rate, as described above, when the number of code words in storage is less than $Nc$ (17 in Table I). Under these circumstances, the acceleration of the print head is interrupted at the actual print rate correlated with the highest number of code words in storage at the beginning of any spacing character cycle.

During any spacing character cycle, a new code word is likely to be received and stored in the input storage register. If the circuit that monitors the number of code words in storage operates continuously, this may result in an increase in the print rate while the spacing character cycle is still in progress, even though the print head is not in transition from a rest condition. Thus, the columns in the latter part of the spacing character cycle are reproduced at a higher rate than the initial columns in the same cycle. On the other hand, if the monitoring circuit logic is such that the count in the storage register is detected or utilized only immediately prior to the beginning of each spacing character cycle, no increase in the print rate will occur during a spacing character cycle unless the print head is being accelerated from rest. Either mode of operation is acceptable under the present invention and each affords some advantages. If an increase in speed is effected in the course of a spacing character cycle when acceleration is not being effected, printer operation can be maintained more closely matched with the data input rate. On the other hand, there will be more changes in actual print rate than occur if the detection of the number of code words in storage is effectively limited to intervals immediately prior to the initiation of a spacing character cycle.

Whenever the printer is being operated at a print rate exceeding $Fn$, the total number of code words in storage in the input register is being reduced, since characters are reproduced at a rate above the input data rate. As a consequence, by adherring to the schedule of correlation between print rate and the number of code words in storage, a sequence of print rate timing signals of successively lower frequency is automatically applied to the printer to gradually decelerate the print head toward the normal speed corresponding to the print rate frequency $Fn$ at which spacing characters are reproduced approximately at the code word input rate. This affords a much more even mode of operation than if the printer is maintained at a high print rate until the number of code words in storage is depleted to the number $Nn$ normally maintained in storage followed by an abrupt reduction to the "normal" print rate. A correlation schedule like that set forth in Table I automatically and inherently provides for a gradual deceleration of the print head, a quite desirable operating characteristic.

In order to afford a more complete understanding of the operation of the printer, utilizing the method of the present invention, a chart of the print rate in characters per second as a function of the number of characters printed in each line has been provided, in FIG. 4, for a number of different machine operating conditions. For each of the several curves A through D reproduced in FIG. 4, it has been assumed that the input data rate to the printer remains constant at thirty code words per second and that each code word received is representative of a normal spacing character, except for carriage return and line feed code words that appear after every seventy spacing characters.

In FIG. 4, curve A illustrates the operation of the printer for a first line with the printer starting with no code words in the input storage register. As soon as the first code word is recorded in the storage register, it is immediately read out and employed to reproduce the first spacing character. In accordance with the schedule of Table I, this first character is reproducd at a print rate of 15.7 characters per second, entailing a print rate timing signal frequency $Fo$ of 125.6 Hz (columns per second) so that the first spacing character is reproduced in a period of 0.0637 seconds. During this period, only one additional code word is received, so that the second character cycle is initiated with only one code word in storage and the print rate remains unchanged for the second character.

During the period in which the second spacing character is reproduced, in line A, two additional code words are received and stored in the storage register, so that reproduction of the third spacing character begins with a total of two code words in storage. However, the print rate remains unchanged since, by the schedule set forth in Table I, the lowest print rate corresponding to a frequency of $Fo$ is applied for any number of code words in storage up to a total of four. For this reason, in line A (FIG. 4) the print rate remains constant at the rate determined by the print rate timing frequency $Fo$ throughout the reproduction of the first six characters.

By the beginning of the seventh spacing cycle in the line represented by curve A, there are a total of five code words in the input store. Consequently, for this spacing character the rate is increased to 17.3 characters per second, at a column frequency of 138.4 Hz (see Table I). In the next characer cycle there is an additional code word in storage and the print rate is again increased. The accumulation of additional code words in storage and the increases in print rate to maintain correspondence with the correlation schedule goes forward, in the reproduction of the first line represented by curve A, until the print rate finally reaches the normal print rate represented by the print rate timing frequency $\underline{Fn}$ in the reproduction of the thirty-fourth character in the line. At this stage, there are twelve code words in storage, this being the number of code words $\underline{Nn}$ that correlates with the normal print rate timing frequency Fn.

For the balance of the printing of line A, the print rate remains constant; even though the normal print rate frequency $\underline{Fn}$ affords reproduction at 29.4 characters per second, slightly below the 30 characters per second data input rate, the difference is so small that the end of the seventy character line is reached before thirteen code words are accumulated in storage.

At the end of the first 70-character line reproduced starting from zero code words in the input storage, curve A, a carriage return and line feed occurs. These operations require a substantial time interval, during which additional code words are received and placed in storage. For a typical printer, this time interval may be of the order of 0.244 seconds, so that the next line reproduced, represented in FIG. 4 by curve B, is initiated with a total of eighteen code words in storage.

Referring to the schedule in Table I, it is seen that eighteen code words in storage calls for a print rate of 44.3 characters per second and a print rate timing frequency $\underline{F}$ of 354.4 Hz. If an attempt were made to reproduce the first character in line B at this high print rate, the inertia of the printer would result in a failure to effect the requisite column step movements and the reproduced character would be distorted, usually beyond all recognition. To avoid this distortion, the print head is gradually accelerated by supplying the printer with a sequence of column step signals at progressively shorter time intervals. Stated differently, the print head is accelerated by applying print rate timing signals of progressively increasing frequency for successive columns during the first spacing character cycle, in the sequence set forth in the correlation schedule, Table I. For a normal 8-column spacing character, this means that by the end of the first spacing character cycle the print head has reached a speed corresponding to a print rate of 22 characters per second.

At this point, of course, the print rate has not yet caught up with the number of code words in storage; in actual fact, there are still 18 code words stored in the input register. Consequently, acceleration is continued through the next spacing character cycle, increasing the print rate for each column step so that the print head reaches a speed, at the end of this character, of 30.7 characters per second.

At the beginning of the spacing character cycle for reproduction of the third character in line B, there are still eighteen code words in storage. In compliance with the correlation schedule of Table I, however, acceleration is interrupted at the print rate timing cutoff frequency $\underline{Fc}$ of 330.4 Hz corresponding to a print rate of 41.3 characters per second for any spacing characer where the number of code words in storage at the beginning of the cycle is 17 or more, except under specified excess conditions. Consequently, for this third character in line B, the print rate is established and maintained at the timing frequency $\underline{Fc}$. This print rate is maintained through the reproduction of the ninth character in the line.

At the beginning of the cycle for the tenth spacing character in Line B, the number of code words in storage has been reduced to sixteen and the print rate is correspondingly reduced, in compliance with the correlation schedule, Table I, to 38.7 characters per second. This rate is maintained through reproduction of the 13 character in line B, at which time the high print rate has reduced the number of code words in storage to 15 so that printing of the 14 character in line B is effected at a rate of 36.4 characters per second. The next transition in speed occurs in the reproduction of the 19 character in line B, when there are only 14 code words in storage at the beginning of the spacing character cycle and the print rate is reduced to 34.3 characters per second. Additional reductions in print occur at the 28 and 46 characters; when the 46 character is reached, the number of code words in storage has been reduced to 12 and reproduction goes forward at the normal print rate corresponding to frequency $\underline{Fn}$.

In subsequent portions of the printing of line B, because the frequency $\underline{Fn}$ is slightly below that which would be required for an absolute match with the data input rate, there may be 13 code words in storage at the beginning of some of the character spacing cycles, in which case the print rate is increased one increment for that cycle and then drops down again because the number of code words in storage is again reduced to 12. If operation is continued on the same basis as described above, the reproduction of subsequent lines in the same printer operation will conform approximately to curve B.

Under some circumstances, a very large number of code words may be accumulated in the input register prior to the beginning of a new line of reproduction. This condition may arise in the course of tabulation printing, with numerous carriage returns and delays for movement of the print head to specified tab positions, or under other operating conditions. Curve C in FIG. 4 illustrates the manner in which the printer speed is controlled under circumstances in which a line of print starts with a total of 110 code words in the input storage register; thus, for curve C, the number of code words in storage at the start of the line exceeds the excess number $\underline{Ne}$ (Table I, footnote (1)).

In printing line C, the print head is accelerated on a column-by-column step basis through the printing of the first two characters in the same manner as described above in connection with curve B. However, with an excess number of code words in storage, acceleration is continued through the third character until the maximum print rate of 59.4 characters per second, correlated to the maximum frequency $\underline{Fm}$ of 475.2 Hz, is reached. Thereafter, the printer is maintained in operation at the maximum print rate throughout the printing of the entire line.

Because the print line represented by curve C in FIG. 4 is reproduced, for all except three characters, at a rate almost double the data input rate, the total number of code words in storage after printing of 70 characters in the line is materially reduced. In actual fact, the total number of code words in storage upon completion of lines C is decreased by approximately 32, leaving a total of 78 code words in storage: this number increases during the carriage return interval and the next line of printing starts with some 82 code words in storage. As a consequence, in the next printing line, representing the second line of print after the start from 110 code words in storage, the line is started without having an excess number of code words in storage under conditions set forth in connection with Table I. For this line of print, therefore, represented by curve D in FIG. 4, the print head is accelerated during the first two spacing characters but the acceleration is again cut off at the print rate of 41.3 characters per second, corresponding to the cut-off frequency $F_c$ of 330.4 Hz. This print rate is maintained constant throughout reproduction of this line of print.

For a print line of 70 characters carried out at a print rate as illustrted by curve D, approximately 12 to 13 characters are reproduced in excess of the number of code words received by the printer at the maximum 30 character per second input rate. Consequently, for the postulated starting condition of 110 code words in the input store, the third line of print begins with some 70 code words in storage and again follows curve D. Operation is continued in this manner, assuming a continuous data input at 30 characters/second, until the 6 print line is reached, which starts with approximately 18 to 20 code words in storage. Thus, for the 6 line and all lines thereafter, printing goes forward in accordance with curve B, maintaining about 12 to 13 code words in storage throughout most of each line.

The operational characteristics illustrated in FIG. 4 are based upon the assumption that the print rate is maintained constant throughout each spacing character cycle except when accelerating the print head from rest condition at the beginning of a line. Alternatively, as noted above, the print rate may be increased during any spacing character cycle in which a code word is added in the input storage at some intermediate point in the cycle. The effect of this modification in the method of the invention is illustrated by curves A' through D' in FIG. 5, which correspond in all other respects to the operating conditions for curves A through D, respectively, of FIG. 4. As seen from FIG. 5, there are no changes in the high speed print lines C' and D', as compared with curves C and D. The difference appears in curves A' and B', in each of which the print rate changes (increases) in the course of a substantial number of the individual spacing character cycles.

A Preferred Apparatus Embodiment of the Invention

FIGS. 6, 7 and 8 illustrate specific circuits that may be employed to construct the control system 50 to carry out the print rate control method of the invention as described above. Most of the main control logic unit 57 is illusrated in FIG. 6, together with the input storage register 64.

The main control logic unit 57, in the form illustrated in FIG. 6, is built around a type 8008 microprocessor 91, a commercial CPU available form Intel Corporation of Santa Clara, California. This is a single-chip CPU constructed for use in any arithmetic, control, or decision-making system, centered around an eight-bit internal data bus with all communication within the processor and with eternal components occurring on this bus in the form of eight-bit bytes of address, instruction, or data. Positive logic is employed. The CPU is driven by two non-overlapping clock inputs, Phase 1 and Phase 2, with two clock periods required for each state of the processor. Status signals S0, S1 and S2 and a synchronizing signal SY are generated by processor 91 to inform peripheral circuitry of the operating state of the processor.

Processor 91 is connected to a bi-directional data bus 92 comprising eight lines connected to pins 2 through 9 respectively, of the processor, with each line connected to a 5-volt supply through a 15 kilohm resistor. The output side of bus 92 comprises eight individual amplifiers 100 through 107 connecting the individual lines of the bus to the output lines TBO through TB7. Each of these output lines is connected to one input of an eight-bit latch circuit DL employed as an address register for low-order address information, having a strobe input T1 and a master reset input MR. The data bus output lines TBO through TB7 are also individually connected to the inputs of a second eight-bit latch register DH utilized as a register for high-order address information and having a strobe input T2 and a master rest input MR.

The outputs DLO through DL7 of the register DL are individually connected to the data input terminals of two random access memory devices RAM-O and RAM-1. Device RAM-O has four outputs identified by the reference characters NB4 through NB7; RAM-1 also has four outputs, NBO through NB3. The output lines NBO through NB7 of the two RAM devices constitute input lines for the bi-directional data bus 92 of CPU 91. Each of the two RAM devices also has two additional inputs CE and $\overline{PCW}$, derived from the decoder circuits illustrated in FIG. 7.

The main control logic 57, in the form illustrated in FIG. 6, further comprises an input multiplexer 110 include four logic gate devices D2, E2, F2 and H2. Device D2 has four inputs serving an output connected to the data bus input line NBO and four other inputs serving another output connected to the data bus line NB1. The remaining gate devices E2, F2 and H2 are of similar construction and afford output connections to the remaining data bus input lines NB2 through NB7.

The four inputs to the portion of the logic gate device D2 which controls the output NBO from that device include an input MTO derived from the character generator and program control ROM 61 (FIG. 8). A second input DNX-O is taken from the UART device 53 (FIG. 8). A third input DNY-O is derived from the output of a logic gate device E1 that is paired with a second logic gate device F1 affording a total of eight gate circuits in the input multiplexer 110. The fourth input to the portion of the logic gate device D2 that controls the output NBO is connected to the five volt supply.

The input and output connections to the remaining seven gate sections in the devices D2, E2, F2 and H2 are similar; each section has an output to one of the CPU data bus input lines NB1 through NB7, each has an MT input derived from the ROM, a DNX input derived from the UART and a DNY input from one of the gate logic deices E1 or F1. Those sections of the logic gate deices E2 and F2 that control the outputs to lines NB3, NB4, and NB5 have a fourth input LIN; the fourth input for each of the remaining sections in the logic gate devices D2, E2 and H2 is conneted to system ground. The inputs to the gate devices E1 and F1 are concerned with a variety of printer operating conditions that are not directly pertinent to the print rate control of the present invention, such as line length, low paper condition, page format, last-character viewing, and the like, and hence have not been illustrated.

FIG. 7 illustrates the various decoder circuits employed as peripheral circuits for the CPU 91 of FIG. 6. For the most part, the circuits shown in FIG. 7 are essentially similar to those frequently employed in connection with the TYPE 8008 microprocessor, as described in the manufacturer's literature or in the manual "Microcomputer Design—Systems and Hardware for the 8008/8080" by Donald P. Martin, published by Martin Research Limited of Northbrook, Illinois. Accordingly, only a minimal description of the decoder circuits is provided herein.

The decoder circuits of FIG. 7 include a state decoder 111 that decodes the various state-indicative outputs of CPU 91 to develop eight separate individual strobe signals indicative of the operating states of the CPU. The state decoder 111 includes the integrated circuit logic device B5 with S0, S1, S2, SY', and phase two clock inputs as indicated. It affords $\overline{STOP}$ and $\overline{WAIT}$ input signals, five cycle strobe signals T1 through T5, and an additional strobe timing signal T11.

The state decoder 111 further comprises a flipflop circuit A4 having a set input $\overline{DT13}$ derived from an input-output decoder 117 described hereinafter. The preset input of flip-flop A4 is connected to the $\overline{T11}$ output of device B5. The clock input to flip-flop A4 is an interrupt interval timing signal INTR derived from a timer circuit (not shown). The output INT from flip-flop A4 is connected to the interrupt input of CPU 91 (FIG. 6).

The T11 output of device B5 in the state decoder 111 is also connected to one input of a NOR gate B4 connected in a latch circuit 112 with a second NOR gate B3. Gate B3 has two inputs, one taken from the $\overline{T3}$ output of device B5 and the other a master reset $\overline{MR}$ input derived from a master reset circuit (not shown). The output of latch 112 is designated $\overline{IJAM}$.

A selection decoding circuit 113 shown in the upper right-hand portion of FIG. 7 develops two selector signals SELA and SELB to control operation of the input multiplexer 110 (FIG. 6). The inputs to circuit 113 include the signals DH2 and DH3 from register DH in FIG. 6 and the $\overline{IJAM}$ signal from latch 112. A further input is the signal $\overline{PC3A}$, derived from the input-output decoder 117.

The decoder circuits of FIG. 7 further comprise a timing circuit 114 for the input multiplexer 110 of FIG. 6. This timing circuit 114 includes a flip-flop A4-1 having the set input grounded and the clock input connected to the output $\overline{T3}$ of device B5 in state decoder 111. The output T2 of device B5 is connected to the clear input of flip-flop A4-1 and the preset input to the flip-flop receives a signal $\overline{PCW}$ from another decoder as described below. The output of flip-flop A4-1 is connected to one input of an AND gate B1 that receives a second input SY constituting the synchronizing output from CPU 91 (FIG. 6). The output of gate B1 is connected to one input of a NAND gate D1 that receives another input $\overline{OE}$ from another part of the decoder circuits. The output from gate D1 is an input timing signal for the multiplexer 110 (FIG. 6).

Referring to FIG. 6, it is seen that two signals $\overline{PCW}$ and CE are required to control the operations of the memory devices RAM-0 and RAM-1 in the input storage register 64. These signals are generated in the decoder circuits of FIG. 7. The $\overline{PCW}$ signal is developed by the NAND gate D1-1 shown in the lower left-hand corner of FIG. 7 and having two inputs DH6 and DH7 from the output register DH (FIG. 6). The $\overline{PCW}$ signal is supplied to the flip-flop A4-1, as described above, is supplied to each of the RAM registers (FIG. 6), and is also applied to one input of a NAND gate C1 (FIG. 7) which has a second input from the $\overline{T3}$ output of the state decoder device B5. The output of gate C1 is applied to one input of a NOR gate B1-5 that is connected in a latch circuit 115 with another NOR gate C1-3. A phase one clock input is supplied to gate C1-3. The output R/$\overline{W}$ of latch 115 is connected to one input of a gate C2 that provides the CE output to the RAM registers (FIG. 6).

The T3A output of gate B1 in circuit 114 is supplied to one input of an AND gate C2-1 that receives a second input DH5 from the output register DH (FIG. 6). The output of gate C2-1 is supplied to one input of a NAND gate B3-1. Another input to gate B3-1 is the $\overline{IJAM}$ signal from the gate B3. A third input to gate B3-1 is the signal DH6, taken from the $\overline{DH6}$ output of the output register DH in FIG. 6 through an inverter H3-1. The output from gate B3-1 is the $\overline{OE}$ signal, supplied as an input signal to each of the gates D1 and C2.

The input-output decoder for the CPU 91 (FIG. 6) comprises the circuit 117 shown in the lower right-hand portion of FIG. 7. The configuration for the decoder is essentially conventional, for the type 8008 miniprocessor, and includes an integrated circuit unit E6 having inputs DH1 through $\overline{DH4}$. Another input to device E6 comprises the NAND gate E7 which has three inputs T3A, DH6, and DH7. The output of gate E7 is the signal $\overline{PC3A}$ that is supplied to gates C1-1 and C1-2 in circuit 113. The PC3A signal is also applied to device E6 on a NAND basis with the signal DH5.

Device E6 in the input-output decoder 117 has a total of sixteen outputs, the outputs $\overline{DN0}$ through $\overline{DN7}$ and $\overline{DT10}$ through $\overline{DT17}$. These are input enable and output strobe signals for the CPU.

A flip-flop C8 shown in the lower right-hand corner of FIG. 7 develops the LIN signal for multiplexer 110 (FIG. 6). The clock input to flip-flop C8 is taken from the $\overline{DN6}$ output of the input-output decoder 117. The set and clear inputs to flip-flop C8 are connected together and returned to the 5-volt supply through a one kilohm resistor.

FIG. 8 illustrates the connections for the UART device 53 and the character generator-program memory 61. The connections to the UART device 53 are conventional and hence need not be described in detail. The device 61 comprises two read-only memory devices ROM-0 and ROM-1 which are programmed in accordance with the program set forth hereinafter. The input connections to the two ROM units constitute outputs from the CPU output registers DH and DL (FIG. 6). The ROM outputs MT0 through MT7 are connected back to the input multiplexer 110 of FIG. 6.

FIG. 8 also illustrates the signal column store 67 that actuates the print magnet driver circuits 69 (see FIG. 3). Circuit 67 has eight inputs DL0 through DL7 derived from the low-order output register DL of the main control logic 57 (FIG. 6). A clock input $\overline{DT10}$ from the input-output decoder (FIG. 7) is also provided to device 67. There is also a pulse print timing input from an appropriate timing circuit (not shown).

The stepper motor store 74 is also illustrated in FIG. 8. Tt has four inputs DL0 through DL4 and provides four outputs to each of the line feed driver and carriage motor driver circuits. An additional input to device 74 is the signal $\overline{DT11}$ from the input-output decoder 117, FIG. 7.

In FIGS. 6, 7 and 8, the type designations for the integrated circuit units are set forth within the unit outlines. For individual gates and flip-flops, the preliminary two numbers of the type designation have been omitted to save space; each of these devices is a "74" series TTL unit. Thus, flip-flops A4 and A4-1 comprise a type 7474 unit, gates C1, C1-1, C1-2 and C1-3 constitute a type 7432 unit, etc. For the larger units the type designation is set forth in full.

A comprehensive program for the form of control system 50 as illustrated in FIGS. 6, 7 and 8 is set forth hereinafter. This particular program provides for control of the print head speed in accordance with the method of the invention, as described above; in particular, the appended program, as applied to the specific control circuits of FIGS. 6, 7 and 8 affords operation of the printer in accordance with Table I and with an increase in speed in the course of any spacing character cycle in which an additional code word is recorded in the input storage register as shown in FIG. 5.

```
EXT3   6 0                                                    ERRS=   0   PAGE    1

LINE #   LOC      OBJECT CODE      SOURCE STATEMENTS 1    000000                              A.B    EXT3
    2    000000                      **************7936 VERSION OF ASCII PRINTER.
    3    000000                      ***************WRITTEN BY R. G  RYAN
    4    000000                              ORG  0B                MASTER CLEAR INTERRUPT
    5    000000 250                          XRA                    CLEAR AREG.
    6    000001 121                          OUT  10B               CLEAR PRINT MAGNETS
    7    000002 104 300 001                  JMP  INIT              GO TO INITIALIZATION PROGRAM
    8    000005 104 332 002                  JMP  FETCHB            EXTERNAL PROGRAM ENTRY POINT FOR
    9    000010                       *                             PRINTING.
   10    000010                      ***************************
   11    000010                              ORG  10B               ROUTINE TO CHECK IF KEYBOARD ENTRY
   12    000010                       *                             OR UART RECIEVE WAITING.
   13    000010 066 240              CKINPT LLI  INPCHG-A           SET EXTERNAL INPUT MARKER WORD.
   14    000012 307                          LAM                    IF SIGN BIT SET EXTERNAL INPUT ON
   15    000013 260                          ORA
   16    000014 115                          INP  6B
   17    000015 104 220 001                  JMP  INCH
   18    000020                      ***************************
   19    000020                              ORG  20B               64 WORD BUFFER CHK FOR FULL
   20    000020 066 265                      LLI  PCLS-A            SET STORE POINTER.
   21    000022 307                          LAM
   22    000023 061                          DCL  PCLR              SET READ POINTER.
   23    000024 277                          CPM                    IF RESULT ZERO BUFFER FULL
   24    000025 360                          LLA
   25    000026
   26    000026 007                          RET
   27    000027                      ***************************
   28    000027                              ORG  30B
   29    000030 301                          LAB
   30    000031 056 006                      LHI  6
   31    000033 064 374              FCHTBL ORI  374B
   32    000035 104 042 000                  JMP  TELGET
   33    000040                      ***************************
   34    000040                              ORG  40B               MEMORY LOOK UP RESTORE RAM ADDRESS.
   35    000040 056 004                      LHI  4B
   36    000042 360              TBLGET LLA
   37    000043 307                          LAM                    LOAD MEMORY TO A REG
   38    000044 056 077                      LHI  77B
   39    000046 260                          ORA
   40    000047 007                          RET
   41    000050                      ***************************
   42    000050                      ***************************
   43    000050                              ORG  50B               ROUTINE TO UPDATE 64 WORD STORE PT.
   44    000050 066 302                      LLI  PNTSTR-A          SET INDICATOR FOR CR OR LF BUFFERSED.
   45    000052 307                          LAM                    IF ZERO NOTHING BUFFERSED.
   46    000053 260                          ORA
   47    000054 053                          RTZ
   48    000055 076 000                      LMI  0B                ZERO UT WORD AND UPDATE READ PNTR.
   49    000057 053                          RTZ
   50    000060                      ***************************
   51    000060                              ORG  60B               MOVE READ POINNTER UP 4 POSITIONS.
   52    000060 066 265                      LLI  PCLS-A            SET STORE POINTER WORD.
   53    000062 307                          LAM
   54    000063 004 004                      ADI  4B
   55    000065 104 374 005                  JMP  LODNW
   56    000070                      ***************************
   57    000070                              ORG  70B               INTERRUPT CONTROLLED BY INTERVAL
   58    000070                       *..                           TIMER FOR PRINTING CHARACTERS.
   59    000070 336                          LDL                    SAVE L REG IN D REG
   60    000071 066 254                      LLI  PUSH-A            SAVE A. D. AND H REG IN RAM
   61    000073 370                          LMA                    SAVE A REG
   62    000074 115                          INP  6B                CONVERT FLAGS SIGN AND ZERO NOT
   63    000075 103                          INP  1B                TO USE FUL LOCATIONS.
   64    000076 032                          RAR                    PICK UP CARRY FLAG.
   65    000077 060                          INL  FLGSTR            SET FLAG STOR LOCATION.
   66    000100 370                          LMA                    STORE FLAGS CARRY, SIGN, AND ZERO
   67    000101 060                          INL  HSTOR
   68    000102 375                          LMH                    SAVE H REG.
   69    000103 056 262                      LHI  SPCNTR-A          SET H FOR RAM ADDRESS AND SPACE
   70    000105                       *                             MOTOR CONTROL WORD.
   71    000105 060                          INL  PRESET            SET PRINT MAGNET RESET TIME WORD.
   72    000106 044 004                      NDI  4B                CHECK FOR MAINS POWER FAILURE.
   73    000110 257                          XRM                    IF FALSE PARITY THE RESULT
   74    000111 365                          LLH                    SET SPACE MOTOR CONTROL WORD.
   75    000112 130 201 001                  JFP  PWRCHK            THEN MAINS POWER FAILING.
   76    000115 137                          OUT  17B               PRESET PRINT MAGNET TIME COUNTER.
   77    000116 307                          LAM                    MOTOR GRAY CODE.
   78    000117 012                          RRC                    ROTATE TO NEXT GRAY CODE.
   79    000120 370                          LMA                    STORE BACK.
   80    000121 044 003                      NDI  3B                STRIP EXCESS BITS.
   81    000123 060                          INL  ITRDSC            SET LINE FEED AND SPACE MOTOR CONTROL
   82    000124 257                          XRM                    AND MODIFY SPACE MOTOR IF NEEDED.
   83    000125 370                          LMA                    STORE BACK NEW VALUE IF CHANGED.
   84    000126 060                          INL  PCLR              SET 64 COLUMN READ POINTER WORD.
   85    000127 367                          LLM                    LOAD VARIABLE POINTER TO L REG.
   86    000130 123                          OUT  11B               OUTPUT SPACE AND LINE FEED MOTOR POSITI
   87    000131 307                          LAM                    LOAD PRINT MAGNETS THAT SHOULD ENERGIZE
   88    000132 121                          OUT  10B               OUTPUT PRINT MAGNETS.
   89    000133                      ***************************
   90    000133 060                          INL                    SET PRINT FORMAT AND CR LF INDICATOR WO
   91    000134 260                          ORA                    #7 BIT ON IN PRINT MAGNET WORD INDICATE
   92    000135                       *                             LAST COLUMN OF CHARACTER.
   93    000135 307                          LAM                    LOAD PRINT FORMAT WORD TO A REG.
   94    000136 032                          RAR                    CARRY SET INDICATES A REPEAT OF LAST
   95    000137                       *                             COLUMN OR CR OR LINE FEED.
   96    000137 140 027 001                  JTC  BOLDCL            BRANCH IF REPEAT OR CARRIER RET OR LINE
   97    000142 160 234 000                  JTS  NXTCHR            IF LAST COLUMN GET NXT CHARACTER TO PRI
   98    000145                      ***************************
   99    000145 370                          LMA                    STORE BACK ROTATED PRINT FORMAT WORD.
  100    000146 060                          INL                    GET LOW ORDER ADDRESS OF NEXT COLUMN.
  101    000147 307                          LAM
  102    000150 004 001                      ADI  1B
  103    000152 370                          LMA                    STORE BACK LAST ADDRES + 1.
  104    000153 060                          INL                    SET PAGE ADDRESS INDICATOR WORD.
  105    000154 357                          LHM                    LOAD PAGE ADDRESS TO H REG.
  106    000155 360                          LLA                    LOAD NEW COLUMN ADDRESS TO L REG.
  107    000156 307                          LAM                    LOAD PRINT MAGNETS FOR NEXT COLUMN.
  108    000157 056 375                      LHI  375               LOAD 300 MICRO SECOND COMPENSATOR.
```

```
109   000161 056 264              LLI PLLR-A       SET POINTER.
110   000163 367                  LLM
111   000164 370                  LMA              LOAD NEW PRINT MAGNETS TO PRINT WORD.
112   000165               *                       DIFFERANCE IN TIME THRU INTERRUPT UNDER
113   000165               *                       NXTCHR ROUTINE.
114   000165 066 263              LLI ITRDSC-A     SET LF AND SPACE MOTOR WORD.
115   000167 307                  LAM
116   000170 044 037              NDI 37B          CLEAR LINE FEED MOTOR POWER BIT IF ON.
117   000172 370         RAMP1    LMA              STORE BACK.
118   000173              ******************************
119   000173
120   000173 066 251              LLI PRAMP-A      CHECK IF RAMP SHOULD BE
121   000175 304                  LAE              INCREASED OR DECREASED FROOM
122   000176 277                  CPM              CHARACTER COUNT CONTENTS.
123   000177 230                  SBA
124   000200 274                  CPE
125   000201 217                  ACM
126   000202 060                  INL              CHECK IF AT MAXIMUM SPEED.
127   000203 277                  CPM
128   000204 061                  DCL
129   000205 014 377              ACI 377B         IF AT MAX SUBTRACT ONE.
130   000207 370                  LMA  STORE BACK
131   000210 360                  LLA              SET RAMP POINTER.
132   000211 305                  LAH              PUT COMPENSATOR IN A REG.
133   000212 056 001              LHI 1            SET RAMP TABLE PAGE ADDRESS.
134   000214 207                  ADM
135   000215 127         RAMPB    OUT 13B          SET INTERVAL TIMER.
136   000216              ******************************
137   000216 066 255              LLI FLGSTR-A     START POP ROUTINE.
138   000220 356                  LHL              SET RAM ADDRESS.
139   000221 307                  LAM
140   000222 061                  DCL ASTOR        SET WORD A REG STORED.
141   000223 044 301              NDI 301B         RESTORE CARRY, SIGN, AND ZERO FLAGS.
142   000225 200                  ADA
143   000226 307                  LAM              RESTORE A REG.
144   000227 066 256              LLI HSTOR-A      SET WORD H REG STORED IN.
145   000231 357                  LHM              RESTORE H REG.
146   000232 363                  LLD              RESTORE L REG THAT WAS SAVED IN E REG.
147   000233 007                  RET              EXIT FROM INTERRUPT ROUTINE.
148   000234 306         NXTCHR   LAL
149   000235 066 253              LLI BSTOR-A      STOR BREG
150   000237 371                  LMB
151   000240 004 003              ADI 3B
152   000242 044 037              NDI 37B          MOD 40B COUNNT.
153   000244 066 265              LLI PCLS-A
154   000246 277                  CPM              IF RESULT IS ZERO BUFFER EMPTY.
155   000247 150 211 001          JTZ EFEMP        IF BUFFER EMPTY BRANCH.
156   000252 061                  DCL PCLR         SET READ POINTER STORE WORD.
157   000253 370                  LMA
158   000254 004 003              ADI 3B           SET WORD THAT INDICATES CR OR LF
159   000256 360                  LLA              AND IF DECENDER WITH PAGE ADDRESS.
160   000257 307                  LAM
161   000260 200                  ADA              CHECK IF CR OR LINE FEED.
162   000261 140 305 000          JTC CCRLF        IF SO BRANCH.
163   000264 365                  LLH              SET SPACE MOTOR CONTROL WORD.
164   000265 076 252              LMI 252B
165   000267 060                  INL ITRDCC
166   000270 200                  ADA              CHECK FOR CHANGE IN PLATEN POSITION.
167   000271 230                  SBA
168   000272 257                  XRM
169   000273 044 050              NDI 50B
170   000275 034 004              ORI 4B           TURN POWER ON FOR SPACE MOTOR.
171   000277 041                  DCE              DECREMENT CHARACTER COUNTER.
172   000300 056 372              LHI 372          SET COMPENSATION TIME.
173   000302 104 172 000          JMP RAMP1
174   000305              ******************************
175   000305              *                        CARRIER RETURN AND LINE FEED
176   000305              *                        INITILATION ROUTINE
177   000305 076 012      CCRLF   LMI 12B          SET HALF SPEED FOR LF.
178   000307 066 260              LLI FORMRK-A     PUT 100B IN IF FORM FEED.
179   000311 370                  LMA
180   000312 032                  RAR
181   000313 310                  LBA
182   000314 060                  INL CRCNTR-A
183   000315 044 037              NDI 37           SET LEFT MARGIN DELAY FOR CR.
184   000317 370                  LMA
185   000320 365         CRBCK    LLH              SET SPACE CONTROL WORD.
186   000321 370                  LMA
187   000322 150 327 000          JTZ CROFF
188   000325 076 250              LMI 250B
189   000327 251         CROFF    XRB
190   000330 054 204              XRI 204B         PUT IN SPACH PAOWER BIT
191   000332 310                  LBA
192   000333 060                  INL ITRDSC       SET SPACE LF MOTER CONTROL.
193   000334 307                  LAM
194   000335 044 077              NDI 77B          STRIP REVERSE LINE FEED BIT.
195   000337 261                  ORB
196   000340 370         SETSPB   LMA
197   000341 066 253      SETSPA  LLI BSTOR-A      RESTORE BREG.
198   000343 317                  LBM
199   000344 066 251      SETSP   LLI PRAMP-A      SET RAMP TO ZERO
200   000346 076 000              LMI 0B
201   000350 060                  INL FSTSLW
202   000351 307                  LAM              CHECK IF SLOW MACHINE.
203   000352 074 006              CPI 6B
204   000354 006 066              LAI 66
205   000356 150 215 000          JTZ RAMP3
206   000361 006 143              LAI 143B         CHECK IF OVER 100 CHARACTERS IN CHARACT
207   000363 274                  CPE
208   000364 230                  SBA              IF OVER 100 RUN MACHE VERY FAST.
209   000365 044 006              NDI 6B
210   000367 004 021              ADI 21B
211   000371 370                  LMA              STOR SPEED LIMIT.
212   000372 006 043              LAI 43
213   000374 104 215 000          JMP RAMP3
214   000377              ******************************
215   000377                      ORG 1000B
216   001000              ******************************
217   001000              ****************RAMP SPEED TABLE 32 POSITIONS************
218   001000 101                  DEF 101
219   001001 101                  DEF 101
220   001002 101                  DEF 101
221   001003 101                  DEF 101
222   001004 072                  DEF 072
223   001005 064                  DEF 064
224   001006 057                  DEF 057
225   001007 053                  DEF 053
226   001010 047                  DEF 047
227   001011 043                  DEF 043
228   001012 040                  DEF 040
229   001013 035                  DEF 035
230   001014 032                  DEF 032
```

```
231   001015 027                    DEF 027.
232   001016 025                    DEF 025
233   001017 023                    DEF 023
234   001020 021                    DEF 021
235   001021 017                    DEF 017
236   001022 015                    DEF 015
237   001023 013                    DEF 013
238   001024 012                    DEF 012
239   001025 011                    DEF 011
240   001026 010                    DEF 010B
241   001027                ******************************
242   001027                ******************************
243   001027 245     BOLDCL NOM
244   001030 056 377        LHI 377B              LOAD 500 MICRO SECOND COMPEMNSATOR
245   001032 004 340        ADI 340B
246   001034 307            LAM                   LOAD PRINT FORMAT WORD TO A REG.
247   001035 032            RAR                   ROTATE IN WITH CARRY BIT.
248   001036 275            CPH
249   001037 110 172 000    JFZ RAMP1             BRANCH IF NOL CR OR LF.
250   001042                ******************************
251   001042                ******************************
252   001042 306            LAL
253   001043 066 253        LLI BSTOR-A           SAVE BREG
254   001045 371            LMB
255   001046 310            LBA
256   001047 010            INB
257   001050 361            LLB
258   001051 060            INL
259   001052 307            LAM                   LOAD INTO A REG HALF SPEED WORD.
260   001053 032            RAR                   THIS WORD MAKES THE FIRST TWO STEPS
261   001054 370            LMA                   OF LINE FEED MOTOR AT HALF SPEED.
262   001055         *                            IT IS INITILIZED TO 012B AT THE BEGIN
263   001055         *                            OF LINE FEED.
264   001055 056 263        LHI ITRDSC-A
265   001057 140 130 001    JTC LFNCHG            BRANCH IF CARRY SET FROMM ROTATE OF
266   001062 365            LLH
267   001063 307            LAM                   LOAD SPACE LINE FEED MOTOR CONTROL
268   001064 044 337        NDI 337B              WORD AND CLEAR POWER BIT FOR
269   001066         *                            LINE FEED MOTOR.
270   001066 370            LMA
271   001067 066 260        LLI FORMRK-A
272   001071 103            INP 1                 FORM FEED CHK , IF CARRY IS SET
273   001072 247            NDM
274   001073 257            XRM                   KEEP FEEDING TILL HOLE IN PAPER.
275   001074 200            ADA
276   001075 200            ADA
277   001076 361            LLB
278   001077 317            LBM                   LOAD NUMBER OF LINE FEEDS INTO B REG.
279   001100 011            DCB                   DECREMENT NUMBER OF LINE FEEDS.
280   001101 110 111 001    JFZ LFCONT
281   001104 100 130 001    JFC LFNCHG
282   001107 016 004        LBI 4                 CONTINJ LF ONE MORE HALF STEP.
283   001111 371     LFCONT LMB
284   001112 365            LLH
285   001113 307            LAM                   GE. LAST LINE FEED MOTOR GRAY CODE.
286   001114 044 130        NDI 130B              IF  6 BIT ON THIS INDICATES A REVERSE
287   001116         *                            OF THE GRAY CODE.
288   001116         *                            THE FOLLOWING 5 INSTRUCTIONS ADVANCE
289   001116         *                            OR MOVE BACK THE GRAY CODE FOR THE
290   001116         *                            LINE FEED MOTOR DEPENDING ON THE
291   001116         *                            STATE OF THE 6 BIT.
292   001116         *
293   001116 006 010        LAI 10B
294   001120 170 124 001    JTP LFCHGS
295   001123 002            RLC
296   001124 257     LFCHGS XRM                   PUT LINE FEED MOTOR POWER BIT ON.
297   001125 064 040        ORI 40B               STORE BACK.
298   001127 370     DTMOVE LMA
299   001130 051     LFNCHG DCH
300   001131                ***********************CARRIER RETURN CONTROL******
301   001131 365            LLH
302   001132 307            LAM                   LOAD SPACE CONTROL WORD TO A REG.
303   001133 044 006        NDI 6B                FALSE PARITY WILL ONLY OCCUR WHEN
304   001135 130 341 000    JFP SETSPA            THE SPACE MOTOR IS BACKING OUT 6 STEPS
305   001140         *                            OR STEPPING FORWARD 6 STEPS.
306   001140 066 263  CRCHK LLI ITRDSC-A          SET MOTOR CONTROL WORD.
307   001142 307            LAM                   LOAD TO A REG AND CLEAR OUT SPACE
308   001143 044 173        NDI 173B              POWER BIT.
309   001145 370            LMA                   STORE BACK.
310   001146 061            DCL SPCNTR-A          SET SPACE MOTOR CONTROL WORD.
311   001147 076 000        LMI 0B                CLEAR SPACE CONTROL WORDX THIS IS
312   001151         *                            ALSO USED FOR INTERRUPT BUFFER EMPTY.
313   001151 061            DCL CRCNTR            SET LEFT MARGIN DELAY WORD.
314   001152 317            LBM                   LOAD TO B REG.
315   001153 011            DCB                   DECREMENT DELAY WORD.
316   001154 160 166 001    JTS ATLEFT
317   001157 371            LMB
318   001160 006 253        LAI 253B              IF ZER RENGAGE PAWL
319   001162 310            LBA
320   001163 150 320 000    JTZ CRBCK
321   001166 022     ATLEFT RAL
322   001167 022            RAL                   OR LINE FEED IS STILL IN PROGRESS
323   001170 022            RAL
324   001171 230            SBA                   WILL BE 377BX. UF NOT RESULT IS 0
325   001172 066 264        LLI PCLR-A            SET CR LF INDICATOR WORD IN BUFFER.
326   001174 367            LLM
327   001175 060            INL
328   001176 104 340 000    JMP SETSPB            CLEAR CRMRK WORD.
329   001201                ******************************
330   001201 060     PWRCHK INL ITRDSC-A          GET VALUE OF SPACE AND LF MOTORS
331   001202 307            LAM                   AND CLEAR POWER BITS .
332   001203 044 033        NDI 33B
333   001205 123            OUT 110
334   001206 104 344 000    JMP SETSP             SET RAMP BACK TO ZERO.
335   001211                ******************************
336   001211 061     BFEMP  DCL FCLR
337   001212 367            LLM
338   001213 076 200        LMI 200               NULL PRINT MAGNETS
339   001215 104 140 001    JMP CRCHK
340   001220                ******************************
341   001220 160 003 010 INCH JTS 10003B          BRANCH TO EXTERNAL PROGRAM INPUT
342   001223         *                            IF SIGN BIT SET.
343   001223 013            RFZ                   IF NOT ZERO SERIAL INPUT DEFEAT.
344   001224 044 042        NDI 42B               GET UART AND KEYBOARD RESDY BITS.
345   001226 054 040        XRI 40B
346   001230 110 235 001    JFZ INCHER            BRANCH IF NO KEYBOARD DATA READY
347   001233         *                            OR TRANSMIT UART EUSY.
348   001233 117            INP 7B                INPUT KEYBOARD INFORMATIO AND OUTPUT TO
349   001234 133            OUT 15B               TRANSMIT SIDE OF UART.
350   001235 115     INCHER INP 6B                CHECK FOR CHARACTER RECIEVED ON UART.
351   001236 200            ADA                   IF BIT 6 NOT SET RETURN.
352   001237 023            RFS
```

```
353   001240 066 250    INCHA  LLI  PCHS-A     SET WORD FOR 128 CHARACTER BUFFER.
354   001242                                    STORE POINTER.
355   001242 307                LAM             LOAD TO A REG.
356   001243 061                DCL  PCHR       SET READ POINTER STORE.
357   001244 004 002            ADI  2B         CHECK IF BUFFER FULL.
358   001246 277                CPM             IF FULL RETURN AND ADMIT DEFEAT.
359   001247 053                RTZ
360   001250 060                INL             SET STORE POINTER BACK UP.
361   001251 370                LMA             LOAD NEW POINTER INTO RAM.
362   001252 012                RRC             TRANSPOSE NEW POINTER.
363   001253 004 040            ADI  40B
364   001255 360                LLA
365   001256 113                INP  5B         INPUT RECIEVED UART INFORMATION.
366   001257 044 177            NDI  177B       STRIP EXCESS BITS.
367   001261 370                LMA             STORE IN 128 BUFFER.
368   001262 040                INE             INCREASE CHARACTERS IN STORAGE COUNT.
369   001263 007                RET             EXIT.
370   001264           ************************
371   001264 054 020    SETF1V ORI  20B         CHECK IF CCITT MODE
372   001266 271                CPB
373   001267 310                LBA
374   001270 076 203            LMI  203B       SET UART FOR FIVE LEVEL MACHINE.
375   001272 013                RFZ             RETURN IF NO CCITT MACHINE.
376   001273 066 243            LLI  CCITT-A    SET INDICATOR FOR CCITT
377   001275 076 013            LMI  013        LOAD TABLE ADD FOR CCITT MACHINE.
378   001277 007                RET
379   001300           ************************
380   001300 123        INIT   OUT  11B         CLEAR SPACE AND LF MOTERS.
381   001301 320                LCA
382   001302 340                LEA
383   001303 360                LLA
384   001304 006 010            LAI  10B        CLEAR BREAK ON TX SIDE OF UART.
385   001306 125                OUT  12B
386   001307 372        INITA  LMC             CLEAR MEMORY.
387   001310 060                INL
388   001311 110 307 001        JFZ  INITA      LOOP TILL MEMORY CLEARED.
389   001314 076 200            LMI  200B       SET LAST COLUMN INDICATOR FOR INTERRUPT
390   001316 045                RST  4B         SET H UP TO RAM ADDRESS 77B
391   001317 065                RST  6B         INITILIZE 64 COLUMN BUFFER STORE POINTE
392   001320 103                INP  1B         CHECK WHAT TYPE POWER SUPPLY.
393   001321 044 010            NDI  10B
394   001323 012                RRC
395   001324
396   001324 054 035            XRI  35
397   001326                                    IF PRINT LENGHT ODD PARITY ADD
398   001326                                    20B TO AMOUNT GRED.
399   001326 170 335 001        JTP  FSTMCH     BRANCH IF FAST MACHINE.
400   001331 066 252            LLI  FSTSLW-A   SET SPEED LIMIT WORD.
401   001333 076 006            LMI  6B         LOAD SLOW MACHINE RAMP LIMIT.
402   001335 066 257    FSTMCH LLI  FRESET-A    LOAD PRINT MAGNET TIME TO RAM.
403   001337 370                LMA
404   001340 066 240            LLI  INPCHG-A   DIABLE INPUT AND PUT START
405   001342 076 037            LMI  37         OF TEST MESSAGE IN.
406   001344 060                INL  UARTS      SET STORAGE AREA FOR UART CONTROL.
407   001345 076 217            LMI  217B       SET FOR ASCII MACHINE.
408   001347 103                INP  1          CHECK FOR ASCII OR FIVE LEVEL MACHINE.
409   001350 044 004            NDI  4B
410   001352 101                INP  0B         IF FIVE LEVEL MACHINE BRANCH.
411   001353 310                LBA
412   001354 152 264 001        CTZ  SETF1V
413   001357 066 300            LLI  SWPNT-A    SET STORE FOR FRONT 13 POSITION SWITCH.
414   001361 076 301            LMI  LFSWTH-A
415   001363 066 275            LLI  SWSTRO-A   SET INP 0B STORE LOCATION.
416   001365 106 134 002        CAL  STUART
417   001370 035                RST  3B         FIND PRINT LINE LENGHT
418   001371 066 271            LLI  ENDLN-A    STORE MAXIMUM NUMBER FOR REFERANCE.
419   001373 370                LMA
420   001374 060                INL  RSWCNT     LOAD RIGHT SWITCH COUNTER.
421   001375 370                LMA
422   001376 106 067 003        CAL  NL         GENERATE CARRIER RETURN LINE FEED.
423   002001 115                INP  6          ENABLE INTERRUPT FOR RESTART 70
424   002002 056 020            LHI  20B        CHECK IF /F/ROM PROGRAMER CONNECTED.
425   002004 362                LLC             IF SO SIGN BIT WILL BE A LOGIC
426   002005 307                LAM             AT PAGE 20 WORD ZERO.
427   002006 044 200            NDI  200B
428   002010 122 000 020        CFS  20000      IF SO BRANCH TO F/ROM PROGRAMER.
429   002013 056 010            LHI  10         CHECK IF EXTERNAL PROGRAM.
430   002015 247                NDM
431   002016 122 000 010        CFS  10000      IF SO CAL EXTERNAL PROGRAM.
432   002021 061                DCL             CHECK IF CHARACTER SUBSITUTUION PROM IN
433   002022 050                INH
434   002023 247                NDM             IF SO SIGN BIT WILL BE ZERO.
435   002024 370                LMA             STORE FLAG IF SO.
436   002025 045                RST  4B         SET RAM PAGE ADDRESS.
437   002026 106 333 003        CAL  PATCHK
438   002031 026 000    START  LCI  0B          CLEAR C REG FOR LCV TIME OUT.
439   002033 106 272 002        CAL  CHCL       CALL PRINT CHECK ROUTINE.
440   002036 104 031 002        JMP  START
441   002041           ************************
442   002041 000        LCV    HLT
443   002042 250               XRA
444   002043 264               ORE              CHECK IF ALL CHARACTERS PRINTED.
445   002044 013               RFZ              IF NOT RETURN.
446   002045 310               LBA
447   002046 055               RST  5B          EXECUTE ALL BUFFERED CR AND LF.
448   002047 105               INP  002B        CHECK FOR HERE IS SWITCH
449   002050 260               ORA              IF SWITCH IS ON NO SIGN BIT WILL
450   002051 120 232 003       JFS  ASNBCK      BE ON SO BRANCH TO ANSWER BACK.
451   002054 066 275           LLI  SWSTRO-A    CHECK FOR LCV ON.
452   002056 307               LAM
453   002057 044 100           NDI  100B
454   002061 020               INC
455   002062 120 272 002       JFS  CHCL        CHECK IF BUFFER STILL EMPTY.
456   002065 066 277    LCVXX  LLI  LCVA-A      PUT LCV UP IF TIMED OUT
457   002067 277               CPM              CHECK IF LCV ALREADY UP.
458   002070 013               RFZ              IF SO RETURN.
459   002071 076 007           LMI  7           LOAD INDICATOR FOR LCV UP.
460   002073 006 005           LAI  5B          SET LCV UP FOR 2.5 LINES.
461   002075 104 002 004       JMP  LCVUP
462   002100           ************************
463   002100 066 277    LCVRET LLI  LCVA-A      CHECK IF LCV UP.
464   002102 277               CPM              IF WORD ZERO LCV IS NOT UP.
465   002103 053               RTZ              RETURN IF LCV NOT UP
466   002104 317               LEM              BRING LCV DOWN 3.5 LINES AND UP 1.
467   002105 370               LMA              CLEAR LCV WORD.
468   002106 104 310 003       JMP  LCVDWN
469   002111           ************************
470   002111           ************************
471   002111 267        STPRTA ORM              IF ZERO PRINT REGULAR 5X7.
472   002112 006 005           LAI  5B          IF EXPANDED SIGN WILL BE SET.
473   002114 063               RTS  STPRTB
474   002115 302               LAC              IF NOT SET BOLSD
```

```
475   002116 247                NOM
476   002117 007                RET   STPRTB
477   002120              ***************************
478   002120 066 245      CHCB  LLI  BELDLY-A       CHECK IF BELL DELAY TIMED OUT.
479   002122 307                LAM
480   002123 004 007            ADI  7B             CHECK BELL DELAY.
481   002125 370                LMA                 IF SO SIGN BIT WILL BE SET.
482   002126 023                RFS
483   002127 374                LME                 RESET BELL DELAY.
484   002130 061                DCL  BELCNT         CHECK IF ANY BELLS BUFFERED.
485   002131 317                LBM                 CHECK IF ANY BELLS STORED.
486   002132 011                DCB
487   002133 053                RTS                 IF BELL COUNT ZERO RETURN.
488   002134 371       STUART   LMB
489   002135 066 241            LLI  UARTS-A        OUTPUT UART CODE WITH BELL.
490   002137 307                LAM
491   002140 135                OUT  16B
492   002141 007                RET
493   002142              ***************************
494   002142 066 242      FIVCHK LLI SHIFT-A        ADD FIGURES CODE IF IN FIGURES MODE.
495   002144 307                LAM
496   002145 201                ADB
497   002146 004 146            ADI  FIVTAB-4000B   ADD ON FIVE LEVEL CODE CONVERSION TABL
498   002150 045                RST  4B
499   002151 310                LBA
500   002152 023                RFS                 RETURN IF CODE THE SAME FOR ALL BADAUT
501   002153 044 040            NDI  40B
502   002155 066 242            LLI  SHIFT-A
503   002157 370                LMA
504   002160 251                XAB                 CHECK IF CCITT OR USA 5 LEVEL.
505   002161 245                NDH
506   002162 060                INL  CCITT-A        ADD 12B IF CCITT MACHINE.
507   002163 207                ADM
508   002164 004 246            ADI  FVTAB-4000B
509   002166 045                RST  4B
510   002167 310                LBA
511   002170 023                RFS
512   002171 024 202            SUI  202B
513   002173 106 242 002        CAL  BLDPG
514   002176 074 206            CPI  206            IF CODE THAT SHOULD PRINT
515   002200 230                SBA                 RESULT WILL EQUAL ZERO.
516   002201 044 203            NDI  203            IF CONTROL RESULT 203
517   002203 074 377            CPI  377            SET SIGN BIT
518   002205 007                RET
519   002206 066 377      CHKSUB LLI PROMIN-A       CHECK IF CHARACTER SUBTITUTION.
520   002210 307                LAM
521   002211 260                ORA                 IF INDICATOR ZERO PROM IN
522   002212 160 220 002        JTS  ROMGEN
523   002215 361                LLB                 LOOK IN SUB PROM AND SEE IF THIS
524   002216 056 011            LHI  11             CHARACTER SHOULD BE SUBSEB
525   002220 257       ROMGEN   XRM                 IF SO A REG WILL EQUAL FALSE ZERO.
526   002221 110 262 002        JFZ  DONTFO         IF SUBSTITUDE DON'T FIGURE H AND L
527   002224 066 275      TBLADJ LLI SUSTRO-A
528   002226             ***************************
529   002226 056 140            LHI  140B           IF 96 AND 128 SWITCH OFF FOLD
530   002230 307                LAM                 OVER  UPPER 32 CODES BUT DO NOT
531   002231 002                RLC                 CHANGE DELETE.
532   002232 241                NDB
533   002233 010                INB
534   002234 241                NDB
535   002235 275                CPH
536   002236 230                SBA
537   002237 064 337            ORI  337B
538   002241 201                ADB                 END OF FOLD OVER.
539   002242             ***************************
540   002242 056 003      BLDPG  LHI  3B
541   002244 004 122            ADI  122B
542   002246 024 052      CPAGN  SUI  52B           FIND PAGE ADR.
543   002250 050                INH
544   002251 074 052            CPI  52B
545   002253 120 246 002        JFS  CPAGN
546   002256 200                ADA                 FIND L ADDRESS BY MULTIPLI BY 6.
547   002257 310                LBA
548   002260 200                ADA
549   002261 201                ADB
550   002262 066 266      DONTFO LLI LADR-A         STORE L ADDRESS FOR PRINT COLUMNS.
551   002264 370                LMA
552   002265 060                INL  PAGADR         STORE PAGE ADDRESS FOR PRINT COLUMNS.
553   002266 375                LMH
554   002267 104 042 000        JMP  TBLGET
555   002272             ***************************
556   002272 106 120 002  CHCL   CAL  CHCB          CHECK BELL.
557   002275 015       CHCLA     RST  1B            CHECK UART INPUT.
558   002276 066 247            LLI  PCHR-A         SET READ POINTER FOR 128 BUFFER
559   002300 307                LAM
560   002301 060                INL                 SET 128 BUFFER STORE POINTER WORD.
561   002302 277                CPM                 COMPARE POINTERS IF SAME BUFFER EMPTY.
562   002303 150 041 002        JTZ  LCV
563   002306 004 002            ADI  2B             SET NXT READ POINTER.
564   002310 061                DCL  PCHR           SET BACK TO READ POINTER STORE.
565   002311 370                LMA
566   002312 012                RRC                 TRANSPOSE POINTER.
567   002313             ***************************
568   002313 004 040            ADI  40B
569   002315 061                DCL  EXTGO          CHECK IF BRANCH TO EXTERNAL PROGRAM.
570   002316 277                CPM                 IF SIGN SET GO EXTERNAL.
571   002317 360                LLA
572   002320             ***************************
573   002320 317                LBM                 PUT CHARACTER IN B REG.
574   002321 140 006 010        JTC  010006         BRANCH TO EXTERNAL IF SO
575   002324 103       FETCH    INP  1B             CHECK IF FIVE LEVEL V CODE MACHINE.
576   002325 044 004            NDI  4B             IF SO RESULT WILL BE ZERO.
577   002327 152 142 002        CTZ  FIVCHK         BRANCH IF FIVE LEVEL CODE MACHONE.
578   002332 122 206 002  FETCHB CFS CHKSUB
579   002335 066 276      PRTANY LLI ESCHR-A        GET CONTENTS OF ESCAPE CONTROL STORAGE.
580   002337 026 203            LCI  203            SET C REG UP FOR NOP IF NOT PART
581   002341 277                CPM                 IF NOT PART OF ESCAPE SEQUENCEC
582   002342 140 054 004        JTC  NOEXT
583   002345 320                LCA                 CHECK IF CONTROL CHARACTER.
584   002346 200                ADA                 IF SO CARRY BIT WILL BE SET.
585   002347 140 023 004        JTC  CNTRES
586   002352             *                          NL OR LCV DOWN.
587   002352 044 020            NDI  20B            CHECK IF SPACE CODE.
588   002354 152 100 002        CTZ  LCVRET         CHECK IF LCV UP IF NOT SPACE.
589   002357 015       BUFST    RST  1B             CHECK FOR INPUTS.
590   002360 055                RST  5B             EXECUTE LF AND CR THAT HAVE NOT
591   002361 025                RST  2B             CHECK IF BUFFER FULL.
592   002362 150 357 002        JTZ  BUFST          IF SO TRY AGAIN.
593   002365 066 273            LLI  BLDADR-A       CHECK WICH PRINT FORMAT.
594   002367 302                LAC
595   002370 044 007            NDI  7B
596   002372 074 005            CPI  5B
```

```
597   002374 162 111 002           CTS   STPRTA
598   002377 004 314     STPRTB    ADI   BOLD-4000B       ADD TABLE.
599   003001 045                   RST   4B
600   003002 032                   RAR
601   003003 310                   LBA                    SAVE PRINT FORMAT.
602   003004 006 001               LAI   1                SET ONE TO ADD TO HORIZONTAL LINE COUNT
603   003006 066 272    ONLY1      LLI   RSWCNT-A         SET UP SPACE COUNTER
604   003010 217                   ACM
605   003011 370                   LMA                    STOR NEW SPACE COUNT.
606   003012 061                   DCL   ENDLN            CHECK IF OVER PRINT LINE LENGHT.
607   003013 277                   CPM
608   003014 122 067 003           CFS   NL               IF SO GENERATE NEW LINE.
609   003017 120 357 002           JFS   BUFST            NL WILL RETURN WITH SIGN ZERO.
610   003022 061                   DCL   DECEND           IF V CHANGE IN PLATEN POSITION
611   003023 302                   LAC                    IS REQUIRED PUT 100B IN WITH PAGADR.
612   003024 257                   XRM
613   003025 372                   LMC
614   003026 022                   RAL
615   003027 044 100               NDI   100B
616   003031 061                   DCL   PAGADR           SET COLUMN PAGE ADDRESS WORD
617   003032 267                   ORM
618   003033 370                   LMA
619   003034 252                   XRC                    CHECK IF FULL UNDERLINE SHOULD PRINT.
620   003035 242                   NDC
621   003036 044 100               NDI   100B
622   003040 061                   DCL   LADR             GET LOW ORDER ADDRESS OF PRINT COLUMNDS
623   003041 327                   LCM
624   003042 061                   DCL   PCLS             GET 32 POSITION BUFFER STORE POINTER.
625   003043 367                   LLM                    LOAD POINTER.
626   003044 370                   LMA                    LOAD IF SPACE OR UNDERLINE SHOULD
627   003045 060                   INL                    PRINT INTO BUFFER.
628   003046 371                   LMB                    LOAD PRINT FORMAT INTO BUFFER2.
629   003047 060                   INL
630   003050 372                   LMC                    LOAD LOW ADDRES INTO BUFFER.
631   003051 060                   INL
632   003052 326                   LCL                    SAVE POINTER.
633   003053 066 267               LLI   PAGADR-A         GET PAGE ADDRESS.
634   003055 307                   LAM
635   003056 362                   LLC                    SET BACK POINTER ADDRESS.
636   003057 370                   LMA
637   003060 065                   RST   6B               UPDATE 32 POSITION BUFFER.
638   003061 066 274               LLI   CRLFK-A          CHECK IF CARRIER RET BEFORE LINE FEED.
639   003063 307                   LAM
640   003064 255                   XRH                    IF SO WORD WILL CONTAIN VALUE OF H REG.
641   003065 013     CRLFD         RFZ
642   003066 370                   LMA                    CLEAR CR BEFORE LINE FEED MARKER.
643   003067 006 010   NL          LAI   010B
644   003071 074 010   CARET       CPI   010B
645   003073 152 351 003           CTZ   LFFRWD
646   003076 016 377   CRA         LBI   377B             SET CARRIER RETURN MARK.
647   003100 015       CHKBF       RST   1B               CHECK INPUTS.
648   003101 066 302               LLI   PNTSTR-A         CHECK IF FIRST CR OR LF AFTER PRINT.
649   003103 307                   LAM
650   003104 260                   ORA                    IF SO BUFFER THIS LF OR CR.
651   003105 110 133 003           JFZ   SECND
652   003110 025                   RST   2B               CHECK IF BUFFER FULL.
653   003111 150 100 003           JTZ   CHKBF            IF SO BRANCH AND TRY AGAIN.
654   003114 076 200               LMI   200B             LOAD CR LF INDICATOR.
655   003116 060                   INL
656   003117 076 377               LMI   377B
657   003121 060                   INL
658   003122 076 001               LMI   1B               INITILIZE NUMBER OF LF STEPS.
659   003124 060                   INL
660   003125 076 200               LMI   200B
661   003127 306                   LAL
662   003130 066 302               LLI   PNTSTR-A
663   003132 370                   LMA
664   003133 367     SECND         LLM
665   003134 261                   ORB                    CHECK IF LINE FEED.
666   003135 120 010 004           JFS   RETLF            IF SO BRANCH.
667   003140 316                   LBL
668   003141 066 273               LLI   BLDADR-A         CLEAR BLD OR EXPAND MODE.
669   003143 076 000               LMI   0L
670   003145 061                   DCL   RSWCNT
671   003146 247                   NDM                    IF LINE CHARACTER COUNT ZERO RETURN.
672   003147 053                   RTZ
673   003150 032                   RAR
674   003151 370                   LMA                    STORE BACK
675   003152 004 361               ADI   361              IF 30 CHARACTERS OR OVER SET MAX DELAY.
676   003154 230                   SBA
677   003155 267                   ORM
678   003156 074 000               LMI   0                CLEAR LINE COUNTER.
679   003160 004 275               ADI   CRTMTB-4000+1
680   003162 045                   RST   4B
681   003163 361                   LLB                    SET BUFF POINTER.
682   003164 370     LOADM         LMA                    LOAD RAM.
683   003165 060                   INL
684   003166 007                   RET
685   003167          **********************************
686   003167 026 200   EXPND       LCI   200B             SET EXPAND MODE OF PRINT.
687   003171 312       BOLDON      LBC                    SET FOR BOLD PRINT ON.
688   003172 066 273   BOLDOF      LLI   BLDADR-A         SET BOLD EXPAND WORD.
689   003174 371                   LMB
690   003175 007                   RET
691   003176          **********************************
692   003176 066 276   ESCPON      LLI   ESCHR-A          SET ESCAPE CODE RECIEVED MARKER.
693   003200 076 300               LMI   300
694   003202 007                   RET
695   003203          **********************************
696   003203 066 244   BELLON      LLI   BELCNT-A         SET BELL COUNT WORD.
697   003205 317                   LBM
698   003206 010                   INB
699   003207 063                   RTS                    RETURN IF OVER 127 BELLS STORED.
700   003210 371                   LMB
701   003211 061                   DCL   CCITT-A          CHECK IF BELL SHOULD PRINT
702   003212 307                   LAM
703   003213 260                   ORA
704   003214 053                   RTZ                    IF NOT RETURN.
705   003215 040                   INE
706   003216 104 126 004           JMP   PTANY1
707   003221          **********************************
708   003221 040       MORTAB      INE                    SUB SPACE FOR TAB.
709   003222 016 040               LBI   40B              FOR TAB OR
710   003224 104 324 002           JMP   FETCH
711   003227          **********************************
712   003227          **********************************
713   003227 250       EOTX        XRA
714   003230 131                   OUT   14               OUTPUT 14 TO INDICATW EOT.
715   003231 007                   RET
716   003232          **********************************
717   003232 106 235 001 ASNBCK    CAL   INCHER           CHECK UART INPUTS.
718   003235 115                   INP   6B               CHECK IF UART TRANSMIT BUF READY.
```

```
719  003236 044 040         NDI 40B
720  003240 150 232 003     JTZ ASNBCK        IF NOT LOOP.
721  003243 301             LAB               LOAD LOW ORDER ADDRESS OF F/ROM.
722  003244 010             INB               SET UP NEXT F/ROM ADDRESS.
723  003245 056 030         LHI 30B           SET HIGH ORDER ADDRESS.
724  003247 106 042 000     CAL TBLGET        IF NO F/ROM OR END OF ANSWER BACK
725  003252 063             RTS               SIGN BIT WILL BE SET.
726  003253 123             OUT 15B           OUTPUT TO TRANSMIT OF UART.
727  003254 104 232 003     JMP ASNBCK        REPEAT TILL SIGN COMES HIGH.
728  003257                 **********************************
729  003257 250      FORMFD XRA               MAKE SURE LCV IS DOWN.
730  003260 106 100 002     CAL LCVRET
731  003263 055             RST 5             ADVANCE BUFFER.
732  003264 106 076 003     CAL CRA
733  003267 361             LLB               SAVE POINTER IF NO MOVEMENT OF
734  003270 112 351 003     CFZ LFFRWD        CARRIER. IF MOVEMANT LF
735  003273 307             LAM               SET FORM FEED MARKER.
736  003274 064 040         ORI 40
737  003276 370             LMA
738  003277 055             RST 5             CLOSE BUFFER.
739  003300 007             RET
740  003301                 **********************************
741  003301 066 306  LFNEG  LLI LNCNT-A       SUBTRACT ONE FROM LINE COUNT.
742  003303 317             LEM
743  003304 011             DCB.
744  003305 371             LMB
745  003306 016 001         LBI 1             SET UP FOR HALF LF NEGATIVE.
746  003310 055      LCVDWN RST 5B            CLEAR ANY LF OR CR BUFFERED.
747  003311 106 001 004     CAL LFSET         PRESET LINE FEED.
748  003314 076 300         LMI 300B          SET NEGATIVE LINE FEED INDICATOR.
749  003316 055      NOP    RST 5B
750  003317 006 010         LAI 10            IF LCVDOWN BRING BACK UP
751  003321 271             CPB               ONE LINE FEED.
752  003322 023             RFS
753  003323 104 004 004     JMP LCVADJ
754  003326                 **********************************
755  003326 371      PTCHK1 LMB
756  003327 040             INB
757  003330 106 332 002     CAL FETCHB
758  003333 066 240  PATCHK LLI INPCHG-A
759  003335 317             LBM
760  003336 010             INB               GET PATTERN CHARACTER
761  003337 101             INP 0
762  003340 261             ORB               IF PATTERN SWITCH NOT ON OR END
763  003341 120 326 003     JFS PTCHK1        OF PATTERN DO NOT PRINT.
764  003344 076 000         LMI 0             ENABLE INPUT FROM UART. AND
765  003346                 *                 DO A NEW LINE.
766  003346                 **********************
767  003346 162 076 003 LNFEED CTS CRA        DO CR IF NL ON CR.
768  003351 103      LFFRWD INP 1B            CHECK FOR 1,1&1/2,OR 2 LINE FEEDS.
769  003352 066 300         LLI SWPNT-A
770  003354 367             LLM
771  003355 370             LMA
772  003356 066 301         LLI LFSWTH-A
773  003360 307             LAM
774  003361 012             RRC
775  003362 012             RRC
776  003363 012             RRC
777  003364 012             RRC
778  003365 064 374         ORI 374           TABLE PAGE 4 ADR 374.
779  003367 045             RST 4             CONVERT BIT PATTERN TO NUMBER OF LF.
780  003370 310      LFRWD  LBA
781  003371 010      LFPLUS INB
782  003372                 **********************************
783  003372 066 310  LFADER LLI EXTLF-A       CHECK IF EXTERNAL LINE FEED CONTROL.
784  003374 307             LAM               IF SO JMP TO JMP IN RAM.
785  003375 260             ORA
786  003376 110 310 077     JFZ EXTLF
787  004001 301      LFSET  LAB
788  004002 200      LCVUP  ADA
789  004003 200             ADA
790  004004 310      LCVADJ LBA
791  004005 104 100 003     JMP CHKBF         SET STORAGE FOR LF STEPS.
792  004010 061      RETLF  DCL
793  004011 307             LAM
794  004012 201             ADB               ADD LF IN 64 BUFFER.
795  004013 271             CPB               CHECK FOR OBER FLOW.
796  004014 120 164 003     JFS LOADM         IF NOT LOAD BUFFER AND EXIT.
797  004017 055             RST 5B
798  004020 104 100 003     JMP CHKBF
799  004023                 **********************************
800  004023 160 043 004 CNTRES JTS ESCP       IF POSSIBLE ESCAPE SEQUENCE BRANCH.
801  004026 275             CPH               CHECK IF EXTERNAL PROGRAM CONTROL.
802  004027 140 054 004     JTC NOEXT         IF NOT BRANCH.
803  004032 245             NDH               MULTIPLY BY THREE FOR BRANCH TABLE
804  004033 320             LCA
805  004034 012             RRC
806  004035 202             ADC
807  004036 026 010         LCI 10B           SET FOR PAGE 10 EXTERNAL PROGRAM.
808  004040 104 077 004     JMP JMPER
809  004043                 **********************************
810  004043 247      ESCP   NDM               CHECK IF ESCAPE FLAG ON.
811  004044 302             LAC
812  004045 150 127 004     JTZ PTANY         IF NOT PRINT.
813  004050 032             RAR               FIND WHAT ESCAPE FUNCTION.
814  004051 032             RAR
815  004052 032             RAR
816  004053 320             LCA
817  004054 076 000  NOEXT  LMI 0             CLEAR ESCAPE MARKER.
818  004056 061             DCL SWSTRO        CHECK IF MONITOR MODE.
819  004057 307             LAM
820  004060 310             LBA
821  004061 200             ADA
822  004062 200             ADA
823  004063 200             ADA
824  004064 302             LAC
825  004065 100 123 004     JFC MONCHK        IF SO BRANCH.
826  004070 044 017  ESCFND NDI 17B
827  004072 004 324         ADI FUNCTN-4000B  ADD CNTRL BRANCH TABLEZ.
828  004074 045             RST 4B
829  004075 026 003         LCI 3B            SET PAGE ADDRESS FOR VARIBLE JMP.
830  004077 066 303  JMPER  LLI VARJMP-A      PRESET VARIABLE BRANCH
831  004101 076 104         LMI 104B
832  004103 060             INL               LOAD REST OF JMP.
833  004104 370             LMA
834  004105 060             INL
835  004106 372             LMC
836  004107 041             DCE               DECREMENT CHARACTER COUNT.
837  004110 006 014         LAI 14B
838  004112 241             NDB
839  004113 026 007         LCI 007           LOAD CONSTANT FOR BOLD PRINT.
840  004115 016 000         LBI 000B          CONSTANT T/ CLEAR BOLD AND EXPAND.
```

```
841.  004117 272                 CFC                    SET SIGN BIT IF NL ON LINE FEED.
842   004120 104 303 077         JMP  VARJMP
843   004123                ********************
844   004123 122 134 004    NONCHK CFS  NLCHK          IF 96 SWITCH ON BRANCH CHK FOR CR BEFOR
845   004126 250            PTANY1 XRA
846   004127 044 007        PTANY  NDI  7B
847   004131 104 335 002           JMP  PRTANY         PRINT CONTROL CODE.
848   004134 074 202        NLCHK  CPI  202B           CHECK IF CARRIER RET OR LF.
849   004136 023                   RFS                 IF NOT RETURN.
850   004137 061                   DCL  CRLFK          CHECK IF CARRIER RETURN PRECEEDED
851   004140 020                   INC                 A LINE FEED.
852   004141 257                   XRM
853   004142 372                   LMC
854   004143 013                   RFZ
855   004144 375                   LMH
856   004145 007                   RET
857   004146               ********************
858   004146               **************5 LEVEL TO ASCII CODE TABLE.
859   004146 201            FIVTAB DEF  201B            NULL
860   004147 105                   DEF  105B            E
861   004150 012                   DEF  012B            LINE FEED.
862   004151 101                   DEF  101B            A
863   004152 040                   DEF  040             SPACE
864   004153 123                   DEF  123B            S
865   004154 111                   DEF  111B            I
866   004155 125                   DEF  125B            U
867   004156 015                   DEF  015B            CARRIER RETURN.
868   004157 104                   DEF  104B            D
869   004160 122                   DEF  122B            R
870   004161 112                   DEF  112B            J
871   004162 116                   DEF  116B            N
872   004163 106                   DEF  106B            F
873   004164 103                   DEF  103B            C
874   004165 113                   DEF  113B            K
875   004166 124                   DEF  124B            T
876   004167 132                   DEF  132B            Z
877   004170 114                   DEF  114B            L
878   004171 127                   DEF  127B            W
879   004172 110                   DEF  110B            H
880   004173 131                   DEF  131B            Y
881   004174 120                   DEF  120B            P
882   004175 121                   DEF  121B            Q
883   004176 117                   DEF  117B            O
884   004177 102                   DEF  102B            B
885   004200 107                   DEF  107B            G
886   004201 240                   DEF  240B            FIGURES SHIFT
887   004202 115                   DEF  115B            M
888   004203 130                   DEF  130B            X
889   004204 126                   DEF  126B            V
890   004205 202                   DEF  202B            LETTERS SHIFT
891   004206 241                   DEF  241             NULL
892   004207 063                   DEF  063B            3
893   004210 012                   DEF  012B            LINE FEED
894   004211 055                   DEF  055B            -
895   004212 040                   DEF  040             SPACE
896   004213 243                   DEF  243             BELL
897   004214 070                   DEF  070B            8
898   004215 067                   DEF  067B            7
899   004216 015                   DEF  015B            CARRIER RETURN.
900   004217 245                   DEF  245
901   004220 064                   DEF  064B            4
902   004221 244                   DEF  244
903   004222 054                   DEF  054B            ,
904   004223 246                   DEF  246
905   004224 072                   DEF  072B            :
906   004225 050                   DEF  050B            X
907   004226 065                   DEF  065B            5
908   004227 252                   DEF  252
909   004230 051                   DEF  051B            <
910   004231 062                   DEF  062B            2
911   004232 247                   DEF  247
912   004233 066                   DEF  066B            6
913   004234 060                   DEF  060B            0
914   004235 061                   DEF  061B            1
915   004236 071                   DEF  071B            9
916   004237 077                   DEF  077B            ●
917   004240 250                   DEF  250
918   004241 240                   DEF  240             FIGURES SHIFT
919   004242 056                   DEF  056B            .
920   004243 057                   DEF  057B            /
921   004244 251                   DEF  251
922   004245 202                   DEF  202B            LETTERS SHIFT.
923   004246               *****************
924   004246               ************************************
925   004246 201            FVTAB  DEF  201             FIGURES MOE
926   004247 200                   DEF  200B            NULL
927   004250 215                   DEF  215B            LETTERS
928   004251 007                   DEF  007             BELL
929   004252 047                   DEF  047
930   004253 044                   DEF  044             ●
931   004254 041                   DEF  041
932   004255 043                   DEF  043             ●
933   004256 046                   DEF  046B            &
934   004257 073                   DEF  073B
935   004260 042                   DEF  042
936   004261                 *     CCITT
937   004261 201                   DEF  201             FIGURES
938   004262 200                   DEF  200B            NULL
939   004263 215                   DEF  215             LETTERS
940   004264 047                   DEF  047B
941   004265 007                   DEF  007B            BELL
942   004266 207                   DEF  207B
943   004267 202                   DEF  202B
944   004270 232                   DEF  232B
945   004271 222                   DEF  222B
946   004272 075                   DEF  075B
947   004273 053                   DEF  053
948   004274               **********************
949   004274                 *    CARRIER RETURN TIME OUT TABLE
950   004274 237            CRTMTB DEF  237             MAX DELAY ENTRY.
951   004275 206                   DEF  206
952   004276 216                   DEF  216
953   004277 222                   DEF  222
954   004300 224                   DEF  224
955   004301 227                   DEF  227
956   004302 227                   DEF  227
957   004303 227                   DEF  227
958   004304 227                   DEF  227
959   004305 227                   DEF  227
960   004306 227                   DEF  227
961   004307 231                   DEF  231
962   004310 231                   DEF  231
```

```
963   004311 233                         DEF 233
964   004312 233                         DEF 233
965   004313 235                         DEF 235
966   004314                     *******************************
967   004314                     *******************************
968   004314                     *       PRINT FORMAT TABLE.
969   004314 006           BOLD  DEF 006B                      5 COL CHARACTER.
970   004315 012                 DEF 012B                      5 COL 1 COL DOUBLE.
971   004316 022                 DEF 022B                      5 COL 2 COL DOUBLE.
972   004317 042                 DEF 042B                      5 CPL 3 COL DOUBLE.
973   004320 102                 DEF 102B                      5 COL 4 COL DOUBLE.
974   004321 277                 DEF 277B                      EXPANDED CHARACTER.
975   004322 007                 DEF 007B                      U 13 COLUMN CHARACTER.
976   004323 000                 DEF 000B                      7COLUMN CHARACTER.
977   004324                     *****************
978   004324                     *******************************
979   004324 071           FUNCTN DEF CARET-3000B              CARRIER RET
980   004325 346                  DEF LNFEED-3000B             LINE FEED
981   004326 176                  DEF ESCRON-3000B             ESCAPE CODE RECIEVED.
982   004327 316                  DEF NOP-3000B                NO OPERATION CODE.
983   004330 203                  DEF BELLON-3000B             BELL CODE RECIEVED.
984   004331 067                  DEF NL-3000B                 VT
985   004332 221                  DEF HORTAB-3000B             HORIZONTAL TAB.
986   004333 316                  DEF NOP-3000B                NO OPERATION CODE ASCII.
987   004334                     *******************
988   004334 171           ESCWRK DEF EOLDON-3000B             BOLD PRINT ON.
989   004335 172                  DEF EOLDOF-3000B             BOLD EXPAND OFF.
990   004336 167                  DEF EXPND-3000B              EXPAND PRINT ON.
991   004337 301                  DEF LFNEG-3000B              REVERSE HALF LINE FEED.
992   004340 371                  DEF LFPLUS-3000B             FORWARD HALF LINE FEED.
993   004341 227                  DEF EOTX-3000B               END OF TRANSMISSION
994   004342 232                  DEF ASNBCK-3000B             ENQ CODE FOR ANSWER BACK.
995   004343 257                  DEF FORMFD-3000B             FORM FEED
996   004344                     *****************
997   004344                     *****************
998   004344                     *************************
999   004344                         ORG 4344                 SET START OF PRINT COLUMN TABLE.
1000  004344 203           NULPRT DEF 203B
1001  004345 010 104 042 021           DEF 010,104,042,021,210
1001  004351 210
1002  004352 203           FIGPRT DEF 203B
1003  004353 004 002 177 002           DEF 004B,002B,177B,002B,204B
1003  004357 204
1004  004360                     *******************PRINT COLUMN TABLE.
1005  004360 207                         DEF 207                      NUL
1006  004361 076 042 042 042           DEF 076,042,042,042,276
1006  004365 276
1007  004366 203                         DEF 203                      SOH
1008  004367 177 001 001 001           DEF 177,001,001,001,201
1008  004373 201
1009  004374 000 000 003 001 002 LFSWPS DEF 000,003,001,002  CONVERSION TABLE FOR LF SWITCH.
1010  005000                         ORG 5000B
1011  005000 203                         DEF 203                      STX
1012  005001 100 100 177 100           DEF 100,100,177,100,300
1012  005005 300
1013  005006 203                         DEF 203         ETX
1014  005007 100 100 100 100           DEF 100,100,100,100,377
1014  005013 377
1015  005014 215                     DEF 215B
1016  005015 003 004 076 020           DEF 003,004,076,020,340
1016  005021 340
1017  005022 216                     DEF 216B                      ENQ
1018  005023 034 111 177 111           DEF 034,111,177,111,234
1018  005027 234
1019  005030 203                         DEF 203                      ACK
1020  005031 060 100 060 014           DEF 060,100,060,014,203
1020  005035 203
1021  005036 204                         DEF 204                      BELL
1022  005037 054 072 012 072           DEF 054,072,012,072,254
1022  005043 254
1023  005044 203                         DEF 203                      BS
1024  005045 007 003 005 030           DEF 007,003,005,030,340
1024  005051 340
1025  005052 206                         DEF 206                      HT
1026  005053 111 111 052 034           DEF 111,111,052,034,210
1026  005057 210
1027  005060 201                         DEF 201                      LF
1028  005061 052 052 052 052           DEF 052,052,052,052,252
1028  005065 252
1029  005066 205                         DEF 205                      VT
1030  005067 020 040 177 040           DEF 020,040,177,040,220
1030  005073 220
1031  005074 217                     DEF 217                      FF
1032  005075 023 044 177 044           DEF 023,044,177,044,223
1032  005101 223
1033  005102 200                         DEF 200                      CR
1034  005103 010 034 052 111           DEF 010,034,052,111,311
1034  005107 311
1035  005110 212                     DEF 212                      SO
1036  005111 076 125 111 125           DEF 076,125,111,125,276
1036  005115 276
1037  005116 211                     DEF 211                      SI
1038  005117 076 101 111 101           DEF 076,101,111,101,276
1038  005123 276
1039  005124 207                     DEF 207B                     DLE
1040  005125 076 052 052 052           DEF 076,052,052,052,276
1040  005131 276
1041  005132 203                         DEF 203                      DC1
1042  005133 076 101 117 111           DEF 076,101,117,111,276
1042  005137 276
1043  005140 203                         DEF 203                      DC2
1044  005141 076 101 171 111           DEF 076,101,171,111,276
1044  005145 276
1045  005146 203                         DEF 203                      DC3
1046  005147 076 111 171 101           DEF 076,111,171,101,276
1046  005153 276
1047  005154 203                     DEF 203B                     DC4
1048  005155 076 111 117 101           DEF 076,111,117,101,276
1048  005161 276
1049  005162 203                         DEF 203                      NAK
1050  005163 060 100 070 014           DEF 060,100,070,014,213
1050  005167 213
1051  005170 203                         DEF 203                      SYN
1052  005171 100 177 001 177           DEF 100,177,001,177,300
1052  005175 300
1053  005176 203                         DEF 203                      ETB
1054  005177 010 010 010 010           DEF 010,010,010,010,377
1054  005203 377
1055  005204 207                         DEF 207                      CAN
1056  005205 076 062 052 046           DEF 076,062,052,046,276
1056  005211 276
1057  005212 203                         DEF 203                      EM
```

```
1058   005213 000 010 177 010           DEF 000,010,177,010,200
1058   005217 200
1059   005220 203                       DEF 203         SUB
1060   005221 006 011 121 001           DEF 006,011,121,001,202
1060   005225 202
1061   005226 202                       DEF 202         ESC
1062   005227 076 111 111 111           DEF 076,111,111,111,276
1062   005233 276
1063   005234 203                       DEF 203         FS
1064   005235 177 111 117 101           DEF 177,111,117,101,377
1064   005241 377
1065   005242 203                       DEF 203         GS
1066   005243 177 111 171 101           DEF 177,111,171,101,377
1066   005247 377
1067   005250 203                       DEF 203         RS
1068   005251 177 101 171 111           DEF 177,101,171,111,377
1068   005255 377
1069   005256 203                       DEF 203         US
1070   005257 177 101 117 111           DEF 177,101,117,111,377
1070   005263 377
1071   005264 011                       DEF 011         SPACE
1072   005265 000 000 000 000           DEF 000B,000B,000B,000B,200B
1072   005271 200
1073   005272 000                       DEF 000
1074   005273 000 000 137 000           DEF 000,000,137,000,200
1074   005277 200
1075   005300 000                       DEF 000
1076   005301 000 007 000 007           DEF 000B,007B,000B,007B,200B
1076   005305 200
1077   005306 000                       DEF 000
1078   005307 024 177 024 177           DEF 024B,177B,024B,177B,224B
1078   005313 224
1079   005314 000                       DEF 000
1080   005315 044 052 177 052           DEF 044B,052B,177B,052B,222B
1080   005321 222
1081   005322 000                       DEF 000
1082   005323 043 023 010 144           DEF 043,023,010,144,342
1082   005327 342
1083   005330 000                       DEF 000
1084   005331 066 111 125 042           DEF 066,111,125,042,320
1084   005335 320
1085   005336 000                       DEF 000
1086   005337 000 013 007 000           DEF 000,013,007,000,200
1086   005343 200
1087   005344 000                       DEF 000
1088   005345 000 034 042 101           DEF 000B,034B,042B,101B,200B
1088   005351 200
1089   005352 000                       DEF 000
1090   005353 000 101 042 034           DEF 000B,101B,042B,034B,200B
1090   005357 200
1091   005360 000                       DEF 000
1092   005361 024 010 076 010           DEF 024B,010B,076B,010B,224B
1092   005365 224
1093   005366 000                       DEF 000
1094   005367 010 010 076 010           DEF 010B,010B,076B,010B,210B
1094   005373 210
1095   005374 044 037         LODNW     NDI 37B
1096   005376 370                       LMA
1097   005377 007                       RET
1098   006000                           ORG 6000B
1099   006000 022                       DEF 022
1100   006001 000 130 070 000           DEF 000,130,070,000,200
1100   006005 200
1101   006006 001                       DEF 001
1102   006007 010 010 010 010           DEF 010B,010B,010B,010B,210B
1102   006013 210
1103   006014 002                       DEF 002
1104   006015 000 140 140 000           DEF 000B,140B,140B,000B,200B
1104   006021 200
1105   006022 000                       DEF 000B        **** /
1106   006023 040 020 010 004           DEF 040,020,010,004,202
1106   006027 202
1107   006030 000                       DEF 000B        **** 0
1108   006031 000 076 101 101           DEF 000,076,101,101,276
1108   006035 276
1109   006036 000                       DEF 000B        **** 1
1110   006037 104 102 177 100           DEF 104D,102B,177B,100B,300B
1110   006043 300
1111   006044 000                       DEF 000B        **** 2
1112   006045 142 121 121 111           DEF 142B,121B,121B,111B,306B
1112   006051 306
1113   006052 300                       DEF 300B        **** 3
1114   006053 042 101 111 111           DEF 042B,101B,111B,111B,266B
1114   006057 266
1115   006060 310                       DEF 310B        **** 4
1116   006061 030 024 022 177           DEF 030B,024B,022B,177B,220B
1116   006065 220
1117   006066 310                       DEF 310         ***5
1118   006067 047 105 105 105           DEF 047B,105B,105B,105B,271B
1118   006073 271
1119   006074 320                       DEF 320B        **** 6
1120   006075 074 112 111 111           DEF 074B,112B,111B,111B,261B
1120   006101 261
1121   006102 000                       DEF 000B        **** 7
1122   006103 001 161 011 005           DEF 001B,161B,011B,005B,203B
1122   006107 203
1123   006110 330                       DEF 330B        **** 8
1124   006111 066 111 111 111           DEF 066B,111B,111B,111B,266B
1124   006115 266
1125   006116 340                       DEF 340B        **** 9
1126   006117 106 111 111 051           DEF 106B,111B,111B,051B,236B
1126   006123 236
1127   006124 000                       DEF 000
1128   006125 000 146 146 000           DEF 000,146,146,000,200
1128   006131 200
1129   006132 000                       DEF 000
1130   006133 000 133 073 000           DEF 000,133,073,000,200
1130   006137 200
1131   006140 000                       DEF 000
1132   006141 010 024 042 101           DEF 010,024,042,101,200
1132   006145 200
1133   006146 000                       DEF 000
1134   006147 024 024 024 024           DEF 024,024,024,024,224
1134   006153 224
1135   006154 000                       DEF 000
1136   006155 000 101 042 024           DEF 000,101,042,024,210
1136   006161 210
1137   006162 000                       DEF 000
1138   006163 002 001 121 011           DEF 002B,001B,121B,011B,206B
1138   006167 206
1139   006170 000                       DEF 000
```

```
1140   006171 076 101 135 125         DEF 076B,101B,135B,125B,236B
1140   006175 236
1141   006176 001                     DEF 001B        **** A
1142   006177 176 011 011 011         DEF 176B,011B,011B,011B,376B
1142   006203 376
1143   006204 002                     DEF 002B        **** B
1144   006205 101 177 111 111         DEF 101B,177B,111B,111B,266B
1144   006211 266
1145   006212 001                     DEF 001B        **** C
1146   006213 076 101 101 101         DEF 076B,101B,101B,101B,242B
1146   006217 242
1147   006220 002                     DEF 002B        **** D
1148   006221 101 177 101 101         DEF 101B,177B,101B,101B,276B
1148   006225 276
1149   006226 001                     DEF 001B        **** E
1150   006227 177 111 111 111         DEF 177B,111B,111B,111B,301B
1150   006233 301
1151   006234 001                     DEF 001B        **** F
1152   006235 177 011 011 011         DEF 177B,011B,011B,011B,201B
1152   006241 201
1153   006242 001                     DEF 001B        **** G
1154   006243 076 101 101 111         DEF 076B,101B,101B,111B,372B
1154   006247 372
1155   006250 001                     DEF 001B        **** H
1156   006251 177 010 010 010         DEF 177B,010B,010B,010B,377B
1156   006255 377
1157   006256 003                     DEF 003B        **** I
1158   006257 000 101 177 101         DEF 000B,101B,177B,101B,200B
1158   006263 200
1159   006264 004                     DEF 004B        **** J
1160   006265 060 100 101 077         DEF 060,100,101,077,201
1160   006271 201
1161   006272 001                     DEF 001B        **** K
1162   006273 177 010 024 042         DEF 177B,010B,024B,042B,301B
1162   006277 301
1163   006300 001                     DEF 001B        **** L
1164   006301 177 100 100 100         DEF 177B,100B,100B,100B,300B
1164   006305 300
1165   006306 001                     DEF 001B        **** M
1166   006307 177 002 014 002         DEF 177B,002B,014B,002B,377B
1166   006313 377
1167   006314 001                     DEF 001B        **** N
1168   006315 177 006 010 060         DEF 177B,006B,010B,060B,377B
1168   006321 377
1169   006322 001                     DEF 001B        **** O
1170   006323 076 101 101 101         DEF 076B,101B,101B,101B,276B
1170   006327 276
1171   006330 001                     DEF 001B        **** P
1172   006331 177 011 011 011         DEF 177B,011B,011B,011B,206B
1172   006335 206
1173   006336 001                     DEF 001B        **** Q
1174   006337 076 101 121 041         DEF 076B,101B,121B,041B,336B
1174   006343 336
1175   006344 001                     DEF 001B        **** R
1176   006345 177 011 031 051         DEF 177B,011B,031B,051B,306B
1176   006351 306
1177   006352 001                     DEF 001B        **** S
1178   006353 046 111 111 111         DEF 046,111,111,111,262
1178   006357 262
1179   006360 003                     DEF 003B        **** T
1180   006361 001 001 177 001         DEF 001B,001B,177B,001B,201B
1180   006365 201
1181   006366 001                     DEF 001B        **** U
1182   006367 177 100 100 100         DEF 177,100,100,100,377
1182   006373 377
1183   006374                         ***********************************
1184   006374                         ****************PRINT LINE LENGHT TABLE
1185   006374 121             LINEND  DEF 121B                60 CHR. LINE
1186   006375 113                     DEF 113B                74 CHR. LINE
1187   006376 106                     DEF 106B                69 CHR. LINE
1188   006377 063                     DEF 063B                50 CHARACTER LINE LENGHT.
1189   007000                         ****************************
1190   007000                         ORG 7000B
1191   007000             D           EQU *
1192   007000 001                     DEF 001B        **** V
1193   007001 037 040 100 040         DEF 037,040,100,040,237
1193   007005 237
1194   007006 001                     DEF 001B        **** W
1195   007007 177 040 030 040         DEF 177B,040B,030B,040B,377B
1196   007013 377
1196   007014 001                     DEF 001B        **** X
1197   007015 143 024 010 024         DEF 143B,024B,010B,024B,343B
1197   007021 343
1198   007022 003                     DEF 003B        **** Y
1199   007023 003 004 170 004         DEF 003,004,170,004,203
1199   007027 203
1200   007030 001                     DEF 001B        **** Z
1201   007031 141 121 111 105         DEF 141B,121B,111B,105B,303B
1201   007035 303
1202   007036 000                     DEF 000
1203   007037 000 177 101 101         DEF 000,177,101,101,200
1203   007043 200
1204   007044 000                     DEF 000         **** >
1205   007045 002 004 010 020         DEF 002,004,010,020,240
1205   007051 240
1206   007052 000                     DEF 000
1207   007053 000 101 101 177         DEF 000,101,101,177,200
1207   007057 200
1208   007060 000                     DEF 000
1209   007061 004 002 001 002         DEF 004,002,001,002,204
1209   007065 204
1210   007066 140             UNDSCR  DEF 140B                UNDERLINE
1211   007067 100 100 100 100         DEF 100B,100B,100B,100B,300B
1211   007073 300
1212   007074 003                     DEF 003
1213   007075 000 000 007 013         DEF 000,000,007,013,200
1213   007101 200
1214   007102 021                     DEF 021         A
1215   007103 170 024 024 024         DEF 170,024,024,024,370
1215   007107 370
1216   007110 022                     DEF 022B        B
1217   007111 104 174 124 124         DEF 104,174,124,124,250        B
1217   007115 250
1218   007116 021                     DEF 021         C
1219   007117 070 104 104 104         DEF 070,104,104,104,304
1219   007123 304
1220   007124 022                     DEF 022         D
1221   007125 104 174 104 104         DEF 104,174,104,104,270
1221   007131 270
1222   007132 021                     DEF 021         .E
1223   007133 174 124 124 124         DEF 174,124,124,124,304
```

```
1223  007137 304
1224  007140 021              DEF 021              F
1225  007141 174 024 024 024      DEF 174,024,024,024,204
1225  007145 204
1226  007146 021              DEF 021              G
1227  007147 070 104 104 124      DEF 070,104,104,124,364
1227  007153 364
1228  007154 021              DEF 021              H
1229  007155 174 020 020 020      DEF 174,020,020,020,374
1229  007161 374
1230  007162 023              DEF 023              I
1231  007163 000 104 174 104      DEF 000,104,174,104,200
1231  007167 200
1232  007170 024              DEF 024              J
1233  007171 040 100 104 074      DEF 040,100,104,074,204
1233  007175 204
1234  007176 021              DEF 021              K
1235  007177 174 020 020 050      DEF 174,020,020,050,304
1235  007203 304
1236  007204 021              DEF 021              L
1237  007205 174 100 100 100      DEF 174,100,100,100,300
1237  007211 300
1238  007212 021              DEF 021              M
1239  007213 174 010 020 010      DEF 174,010,020,010,374
1239  007217 374
1240  007220 021              DEF 021              N
1241  007221 174 010 020 040      DEF 174,010,020,040,374
1241  007225 374
1242  007226 021              DEF 021              O
1243  007227 070 104 104 104      DEF 070,104,104,104,270
1243  007233 270
1244  007234 021              DEF 021              P
1245  007235 174 024 024 024      DEF 174,024,024,024,210
1245  007241 210
1246  007242 021              DEF 021              Q
1247  007243 070 104 124 044      DEF 070,104,124,044,330
1247  007247 330
1248  007250 021              DEF 021              R
1249  007251 174 024 024 064      DEF 174,024,024,064,310
1249  007255 310
1250  007256 022              DEF 022              S
1251  007257 110 124 124 124      DEF 110,124,124,124,244
1251  007263 244
1252  007264 023              DEF 023              T
1253  007265 004 004 174 004      DEF 004,004,174,004,204
1253  007271 204
1254  007272 021              DEF 021              U
1255  007273 174 100 100 100      DEF 174,100,100,100,374
1255  007277 374
1256  007300 021              DEF 021              V
1257  007301 034 040 100 040      DEF 034,040,100,040,234
1257  007305 234
1258  007306 021              DEF 021              W
1259  007307 174 040 020 040      DEF 174,040,020,040,374
1259  007313 374
1260  007314 021              DEF 021              X
1261  007315 104 050 020 050      DEF 104,050,020,050,304
1261  007321 304
1262  007322 023              DEF 023              Y
1263  007323 004 010 160 010      DEF 004,010,160,010,204
1263  007327 204
1264  007330 022              DEF 022              Z
1265  007331 104 144 124 114      DEF 104,144,124,114,304
1265  007335 304
1266  007336 000              DEF 000
1267  007337 010 010 066 101      DEF 010,010,066,101,301
1267  007343 301
1268  007344 000              DEF 000
1269  007345 000 000 167 000      DEF 000,000,167,000,200
1269  007351 200
1270  007352 000              DEF 000
1271  007353 101 101 066 010      DEF 101,101,066,010,210
1271  007357 210
1272  007360 000              DEF 000
1273  007361 010 004 010 020      DEF 010,004,010,020,210
1273  007365 210
1274  007366 203              DEF 203        DELETE
1275  007367 125 052 125 052      DEF 125,052,125,052,325
1275  007373 325
1276  007374                  ****************************
1277  007374                  ****************************END OF TABLE
1278  007374 250         EXTLCV  XRA             EXTERNAL INPUT FOR LCVUP.
1279  007375 104 065 002         JMP LCVXX
1280  010000                  ********************
1281  010000                  *****************
1282  010000                  ********************************
1283  010000                  ****************************
1284  010000                          ORG  77000
1285  077000         A      EQU *
1286  077000                         ORG 77240B        SET RAM ADDRESS.
1287  077240 000     INPCHG DEF 0           UART INPUT OUTPUT CONTROL WORD.
1288  077241 000     UARTS  DEF 0B          STORAGE FOR PRESET OF UART CODE.
1289  077242 000     SHIFT  DEF 0    FIVE LEVEL CODE SHIFT CONTROL
1290  077243 000     CCITT  DEF 0           TELLS IF USA BAUDAT OR EQURPE.
1291  077244 000     BELCNT DEF 0    BELL COUNTER
1292  077245 000     BELDLY DEF 0    DELAY FOR BELL BUSY.
1293  077246 000     EXTGO  DEF 0           MARKER FOR BRANCH TO EXTERNAL
1294  077247         *                       PROGRAM AFTER GETTING CHARACTER.
1295  077247 000     PCHR   DEF 0    CHARACTER BUFFER READ PNTR.
1296  077250 000     PCHS   DEF 0    CHARACTER BUFFER STORE PNTR.
1297  077251 000     PRAMP  DEF 0    RAMP CONTROL WORD.
1298  077252 000     FSTSLW DEF 0           MARKER FOR SLOW OR FAST PRINTING.
1299  077253 000     BSTOR  DEF 0    BREG STORAGE FOR INTERRUPT.
1300  077254 000     PUSH   DEF 0    AREG STORAGE FOR INTERRUPT.
1301  077255 000     FLGSTR DEF 0           STORAGE FOR CARRY,SIGN,ZERO FLAGS.
1302  077256 000     HSTOR  DEF 0    HREG STORAGE FOR INTERRUPT.
1303  077257 000     PRESET DEF 0           WORD WICH HODS PRINT MAGNET TIME.
1304  077260 000     FORMRK DEF 0    MARKS FORM FEED FOR INTERUPPT .
1305  077261 000     CRCNTR DEF 0    CONTROL WORD FOR C.R.
1306  077262 000     SPCNTR DEF 0    SPACE MOTOR CONTROL WORD.
1307  077263 000     ITRDSC DEF 0    LINE FEED MOTOR CONTROL.
1308  077264 000     PCLR   DEF 0    64 POSITION BUF READ PNTR.
1309  077265 000     PCLS   DEF 0    64 OOSITION BUF STR PNTR.
1310  077266 000     LADR   DEF 0           STORAGE FOR LOW ORDER ADR OF PRT TBL.
1311  077267 000     PAGADR DEF 0           STORAGE FOR PAGE ADR OF PRT TBLE.
1312  077270 000     DECEND DEF 0    DECENDER MEMORY WORD.
1313  077271 000     ENDLN  DEF 0    CARRIER LENGHT STORAGE.
1314  077272 000     RSWCNT DEF 0    COUNTER FOR AUTO END OF LINE.
1315  077273 000     BLDADR DEF 0    BOLD CONTROL WORD.
1316  077274 000     CRLFX  DEF 0    MARKS CARRIER RET BEFORE LF.
1317  077275 000     SWSTRO DEF 0           STORAGE FOR INP 0 SWITCHES
```

```
318  077276 000        ESCHR  DEF 0    ESCAPE CHARACTER MEMORY.
319  077277 000        LCVA   DEF 0    LCV MARKER
320  077300 000        SWPNT  DEF 0             POINTS TO WHICH WORD Z9 POS SWITCH IS S
321  077301 000        LFSWTH DEF 0             WORD THAT HOLDS NUMBER OF LINE FEEDS.
322  077302 000        PNTSTR DEF 0    BUF PNTR FOR CR  LF.
323  077303 000        VARJMP DEF 0    O P  PART OF VARACLE JMP
324  077304 000        JMPVAR DEF 0    LOW ORDER BITS OF VAR JMP
325  077305 000        JMPVR2 DEF 0    HI  ORDER BITS OF VAR JMP
326  077306 000        LNCNT  DEF 0    MAIN LINE COUNTER.
327  077307 000        PAGLN  DEF 0    PAGE LENTH STORAGE.
328  077310 000        EXTLF  DEF 0             VARIBLE JMP FOR LINE FEED ROUTINE.
329  077311               ***********************
330  077311               ORG 77377
331  077377               *                      F/ROM PROGRAMMER.
332  077377 000        PROMIN DEF 0    MARKER FOR SUBSTITUTION PROM
333  100000               ***********************
334  100000               END
  0 ERRORS FOUND IN ASSEMBLY CODE .
```

```
==============================
  SYMBOL   VALUE    REFD
==============================
  1: A        077000   58
  2: ASNECK   003232   4
  3: ATLEFT   001166   1
  4: EELCNT   077244   1
  5: EELDLY   077245   1
  6: EELLON   003203   1
  7: EFEMP    001211   1
  8: ELDADR   077273   3
  9: ELDPG    002242   1
 10: EOLD     064214   1
 11: EOLDCL   001027   1
 12: EOLDOF   003172   1
 13: EOLDON   003171   1
 14: ESTOR    077253   3
 15: EUFST    002357   2
 16: CARET    003071   1
 17: CCITT    077243   1
 18: CCRLF    000305   1
 19: CHCB     002120   1
 20: CHCL     002272   2
 21: CHCLA    002275   0
 22: CHREF    003100   3
 23: CHKSUB   002206   1
 24: CHINPT   000010   0
 25: CNTRES   004023   1
 26: CPAGN    002246   1
 27: CRA      003076   2
 28: CRECK    000320   1
 29: CRCHK    001140   1
 30: CRCNTR   077261   0
 31: CRLFD    003065   0
 32: CRLFK    077274   1
 33: CROFF    000327   1
 34: CRTMTB   004274   1
 35: D        007000   0
 36: DECEND   077270   0
 37: DONTFG   002262   1
 38: DTMOVE   001127   0
 39: ENDLN    077271   1
 40: EOTX     003227   1
 41: ESCEND   004070   0
 42: ESCHR    077276   2
 43: ESCP     004043   1
 44: ESCPON   003176   1
 45: ESCWRK   004334   0
 46: EXPND    003167   1
 47: EXTGO    077246   0
 48: EXTLCV   007374   0
 49: EXTLF    077310   2
 50: FCHTEL   000033   0
 51: FETCH    002324   1
 52: FETCHB   002332   2
 53: FICHST   004552   0
 54: FIVCHK   002142   1
 55: FIVTAE   004146   1
 56: FLGSTR   077255   1
 57: FORNFD   003257   1
 58: FORPRK   077260   2
 59: FSTMCH   001235   1
 60: FSTSLW   077252   1
 61: FUNCTN   004324   1
 62: FVTAB    004246   1
 63: HORTAB   003221   1
 64: HSTOR    077256   1
 65: INCH     001220   1
 66: INCHA    001240   0
 67: INCHER   001235   2
 68: INIT     001300   1
 69: INITA    001307   1
 70: INPCHG   077240   3
 71: ITRDSC   077263   3
 72: JMPER    004077   1
 73: JMPVAR   077304   0
 74: JMPVR2   077305   0
 75: LADR     077266   1
 76: LCV      002041   1
 77: LCVA     077277   2
 78: LCVADJ   004004   1
 79: LCVDWN   003310   1
 80: LCVRET   002100   2
 81: LCVUP    004002   1
 82: LCVXX    002065   1
 83: LFADER   003372   0
 84: LFCHGS   001124   1
 85: LFCONT   001111   1
 86: LFFRWD   003351   2
 87: LFNCHG   001130   2
 88: LFNEG    003301   1
 89: LFPLUS   003371   1
 90: LFRWD    003370   0
 91: LFSET    004001   1
 92: LFSWPS   004374   0
 93: LFSWTH   077301   2
 94: LINEND   006374   0
 95: LNCNT    077306   1
 96: LNFEED   003346   1
 97: LOADM    003164   1
 98: LODNW    005374   1
 99: MONCHK   004123   1
100: NL       003067   3
101: NLCHK    004134   1
102: NOEXT    004054   2
103: NOP      003316   2
104: NULPRT   004344   0
105: NXTCHR   000234   1
106: ONLY1    003006   0
107: PAGADR   077267   1
108: PAGLN    077307   0
109: PATCHK   003333   1
110: FCHR     077247   1
111: FCHS     077250   1
112: PCLR     077264   2
113: PCLS     077265   3
114: PNTSTR   077302   3
115: PRAMP    077251   2
116: PRESET   077257   1
117: PROMIN   077377   1
118: PRTANY   002335   1
119: PTANY    004127   1
120: PTANY1   004126   1
121: PTCHK1   003326   1
122: PUSH     077254   1
123: PURCHM   001201   1
124: RAMP1    000172   2
125: RAMPB    000215   1
126: RETLF    004010   1
127: ROMGEN   002220   1
128: RSWCNT   077272   1
129: SECND    003133   1
130: SETFIV   001264   1
131: SETSP    000344   1
132: SETSPA   000341   1
133: SETSPB   000340   1
134: SHIFT    077242   2
135: SPCNTR   077262   1
136: START    002031   1
137: STFRTA   002111   1
138: STFRTB   002377   0
139: STUART   002134   1
140: SWPNT    077300   2
141: SWSTRO   077275   3
142: TELADJ   002224   0
143: TILGET   000042   3
144: UARTS    077241   1
145: UNDSCR   007066   0
146: VARJMP   077303   2
```

```
==========================================================
LINE #   LOC      OBJECT CODE      SOURCE STATEMENTS
==========================================================
  1    000000                        ASB EXTB
  2    000000                      A    EQU 0
  3    000000                      PRTANY EQU 002335
  4    000000                      DONTFG EQU 002262
  5    000000                      CHKSUB EQU 002206
  6    000000                      PAGADR EQU 267
  7    000000                      FSTSLW EQU 252
  8    000000                      EXTGO  EQU 246
  9    000000                             ORG 10000
 10    010000 066 246                     LLI EXTGO-A       FOR EXTERNAL PROGRAM.
 11    010002 376                         LML
 12    010003 104 064 010                 JMP CONTET
 13    010006                              ORG 010006
 14    010006 106 206 002                 CAL CHKSUB
 15    010011 316                         LBL                SAVE LOW ORDER ADRESS.
 16    010012 320                         LCA*               SAVE PRINT FORMAT WORD.
 17    010013 044 220                     NDI 220            CHECK FOR DECENDERS.
```

```
18   010015 066 267            LLI  PAGADR-A
19   010017 106 034 010        CAL  CHKDEC
20   010022 302                LAC
21   010023 104 335 002        JMP  PRTANY
22   010026                    ORG  010026
23   010026 040                DEF  040
24   010027 000 100 060 000    DEF  000,100,060,000,200
24   010033 200
25   010034 074 020      CHKDEC CPI  20
26   010036 150 051 010        JTZ  DECEND
27   010041 006 007            LAI  7
28   010043 277                CPH
29   010044 013                RFZ
30   010045 006 066            LAI  066
31   010047 271                CPB
32   010050 063                RTS
33   010051 006 026      DECEND LAI  026
34   010053 201                ADB
35   010054 043                RTC
36   010055 056 010            LHI  010
37   010057 106 262 002        CAL  DONTFG
38   010062 320                LCA
39   010063 007                RET
40   010064 066 252      CONTET LLI  FSTSLW-A
41   010066 076 006            LMI  006
42   010070 006 200            LAI  200         ENTRY POINT FROM INTERRUPT
43   010072 066 000            LLI  0
44   010074 007                RET
45   010075                    ORG  010114
46   010114 000                DEF  000
47   010115 000 000 000 000    DEF  000,000,000,000,200
47   010121 200
48   010122 000                DEF  000
49   010123 000 000 000 000    DEF  000,000,000,000,200
49   010127 200
50   010130 000                DEF  000           A
51   010131 070 104 104 050    DEF  070,104,104,050,374
51   010135 374
52   010136 000                DEF  000           B
53   010137 177 050 104 104    DEF  177,050,104,104,270
53   010143 270
54   010144 000                DEF  000           C
55   010145 070 104 104 104    DEF  070,104,104,104,200
55   010151 200
56   010152 000                DEF  000           D
57   010153 070 104 104 050    DEF  070,104,104,050,377
57   010157 377
58   010160 000                DEF  000           E
59   010161 070 124 124 124    DEF  070,124,124,124,230
59   010165 230
60   010166 000                DEF  000           F
61   010167 010 176 011 001    DEF  010,176,011,001,202
61   010173 202
62   010174 040                DEF  040           G
63   010175 014 122 122 114    DEF  014,122,122,114,276
63   010201 276
64   010202 000                DEF  000           H
65   010203 000 177 004 004    DEF  000,177,004,004,370
65   010207 370
66   010210 000                DEF  000           I
67   010211 000 104 175 100    DEF  000,104,175,100,200
67   010215 200
68   010216 040                DEF  040           J
69   010217 040 100 100 100    DEF  040,100,100,100,275
69   010223 275
70   010224 000                DEF  000           K
71   010225 000 177 030 044    DEF  000,177,030,044,300
71   010231 300
72   010232 000                DEF  000           L
73   010233 000 001 177 100    DEF  000,001,177,100,200
73   010237 200
74   010240 000                DEF  000           M
75   010241 174 004 170 004    DEF  174,004,170,004,370
75   010245 370
76   010246 000                DEF  000           N
77   010247 174 010 004 004    DEF  174,010,004,004,370
77   010253 370
78   010254 000                DEF  000           O
79   010255 070 104 104 104    DEF  070,104,104,104,270
79   010261 270
80   010262 040                DEF  040           P
81   010263 176 024 042 042    DEF  176,024,042,042,234
81   010267 234
82   010270 040                DEF  040           Q
83   010271 034 042 042 024    DEF  034,042,042,024,376
83   010275 376
84   010276 000                DEF  000           R
85   010277 004 174 004 004    DEF  004,174,004,004,210
85   010303 210
86   010304 000                DEF  000
87   010305 110 124 124 044    DEF  110,124,124,044,200
87   010311 200
88   010312 000                DEF  000           T
89   010313 000 004 077 104    DEF  000,004,077,104,240
89   010317 240
90   010320 000                DEF  000           U
91   010321 074 100 100 040    DEF  074,100,100,040,334
91   010325 334
92   010326 000                DEF  000           V
93   010327 014 060 100 060    DEF  014,060,100,060,214
93   010333 214
94   010334 000                DEF  000           W
95   010335 074 100 070 100    DEF  074,100,070,100,274
95   010341 274
96   010342 000                DEF  000           X
97   010343 104 050 020 050    DEF  104,050,020,050,304
97   010347 304
98   010350 040                DEF  040           Y
99   010351 116 120 040 020    DEF  116,120,040,020,216
99   010355 216
100  010356 000                DEF  000           Z
101  010357 104 144 124 114    DEF  104,144,124,114,304
101  010363 304
102  010364 000                DEF  000
103  010365 000 000 000 000    DEF  000,000,000,000,200
103  010371 200
104  010372 000                DEF  000
105  010373 000 000 000 000    DEF  000,000,000,000,200
105  010377 200
106  011000                    END
     0 ERRORS FOUND IN ASSEMBLY CODE
```

|  | SYMBOL | VALUE | REFD |
|---|---|---|---|
| 1 | A | 000000 | 3 |
| 2 | CHKSEC | 010034 | 1 |
| 3 | CHKSUB | 002206 | 1 |
| 4 | CHKTET | 010054 | 1 |
| 5 | DECEND | 010051 | 1 |
| 6 | CHKTFG | 002262 | 1 |
| 7 | EXTGO | 000246 | 1 |
| 8 | FSTSLH | 000252 | 1 |
| 9 | FADAOR | 000267 | 1 |
| 10 | FRTANY | 002335 | 1 |

We claim:

1. The method of controlling the print rate of a high speed column-sequential dot matrix printer actuated by an input signal comprising a sequence of code words occurring at a given maximum input rate, the printer comprising a print head, a print head drive for moving the print head through a number of column steps in a spacing character cycle at a speed controlled by a print rate timing signal, and a multi-stage FIFO input storage register, each stage capable of storing a complete code word, comprising the following steps:

monitoring the input storage register to determine the number $N$ of code words in storage;

providing a multiplicity of print rate timing signals in discrete steps of increasingly higher frequency $F$ from a low frequency $F_o$ through a normal frequency $F_n$ to a maximum frequency $F_m$, where $F_o < F_n < F_m$, the print rate timing signal at frequency $F_n$ being effective to actuate the print head drive at a column rate which produces normal spacing characters at a rate approximately matched to the code word input rate;

and selectively applying the print rate timing signals to the printer, in each spacing character cycle, in accordance with a predetermined schedule correlating each print rate timing frequency with a given number of code words in storage at the beginning of the spacing character cycle.

2. The method of controlling the print rate of a column-sequential dot matrix printer, according to claim 1, and including the additional step of:

accelerating the print head, whenever the number $N$ of code words in storage at the beginning of a spacing character cycle exceeds a given minimum number $N_o$ and the print head has been at rest or the frequency of the print rate timing signal for the immediately preceding column was at least two steps below the schedule frequency for that number of code words, by applying print rate timing signals of progressively increasing frequency to the printer for successive columns during that spacing character cycle.

3. The method of controlling the print rate of a column-sequential dot matrix printer, according to claim 2, in which the schedule number $N_n$ of code words in storage correlated with the normal print rate timing signal of frequency $F_n$ substantially exceeds the given minimum number $N_o$, so that at least $N_n$ code words are normally maintained in storage during extended operation of the printer.

4. The method of controlling the print rate of a column-sequential dot matrix printer, according to claim 2, and including the additional steps of:

limiting the speed of the print head to a given cutoff speed by limiting the frequency of the print rate timing signal to a cutoff frequency $F_c$ substantially less than $F_m$ unless the print head starts from rest with a predetermined excessive number $N_e$ of code words in storage;

and accelerating the print head to maximum speed by applying print rate timing signals of progressively increasing frequency up to the maximum $F_m$ when the print head starts from rest with at least $N_e$ code words in storage.

5. The method of controlling the print rate of a column-sequential dot matrix printer, according to claim 4, in which the excessive number $N_e$ is substantially larger than the number $N_m$ of code words correlated with the maximum print rate timing frequency $F_m$.

6. The method of controlling the print rate of a column-sequential dot matrix printer, according to claim 4, in which the cutoff frequency $F_c$ is intermediate the normal frequency $F_n$ and the maximum frequency $F_m$, corresponding to a number $N_c$ of code words in storage substantially higher than $N_n$, and comprising the additional step of:

interrupting acceleration of the print head at a speed less than the given cutoff speed whenever the number of code words in storage is less than $N_c$.

7. The method of controlling the print rate of a column-sequential dot matrix printer, according to claim 1, including the additional step of:

applying the print rate timing signal of the next higher frequency to the printer during the balance of a spacing character cycle in which the number of code words in storage increases prior to completion of a given number of column steps for that spacing character cycle.

8. The method of controlling the print rate of a high speed column-sequential dot matrix priner actuated by an input signal comprising a sequence of code words occurring at a given maximum input rate, the printer comprising a print head, a print head drive for moving the print head across a record medium at a speed controlled by a print rate timing signal comprising a number of column pulses for each spacing character print cycle to record a line of spacing characters, and a multi-stage FIFO input storage register, each stage capable of storing a complete code word, comprising the following steps:

generating a plurality of print rate timing signals of different constant frequencies;

applying print rate timing signals of progressively increasing frequency to the printer to accelerate the print head, at the beginning of a line, to a cutoff speed greater than the speed required to reproduce spacing characters at the maximum input rate;

and thereafter applying a sequence of print rate timing signals of successively lower frequency to the printer to gradually decelerate the print head toward a normal speed at which spacing characters are reproduced approximately at the code word input rate.

9. The method of controlling the print rate of a column-sequential dot matrix printer, according to claim 8, including the further step of:

monitoring the input storage register to determine the number of code words in storage;

and limiting the cutoff speed in accordance with the number of code words in storage.

10. The method of controlling the print rate of a column-sequential dot matrix printer, according to claim 9, in which the cutoff speed limitation is effected in accordance with the following schedule:

| Number of Word in Storage at Start of Line | Cutoff Frequency for Print Rate Timing Signal |
|---|---|
| 1 to $N_n$ | $F_n$ |
| $N_n+1$ to $N_e$ | $F_c$ |
| over $N_e$ | $F_m$ | where $Fn$ is a print rate timing signal frequency which actuates the print head drive to reproduce normal spacing characters at a rate approximately matched to the maximum data input rate, $Fm$ is the maximum print rate timing signal frequency, $Fm>Fc>Fn$, and $Ne>>Nn$.

11. A control system for controlling the print rate of a high speed column-sequential dot matrix printer actuated by an input signal comprising a sequency of code words occurring at a given maximum input rate, the printer comprising a print head, a print head drive for moving the print head through a number of column steps in a print cycle at a speed controlled by a print rate timing signal, and a multi-stage FIFO storage register, each stage capable of storing a complete code word, the control system comprising:

clock means for generating a plurality of print rate timing signals of different constant frequency ranging from a low frequency $Fo$ through a normal frequency $Fn$ to a maximum frequency $Fm$, where $Fo<Fn<Fm$, and where the normal print rate timing signal of frequency $Fn$ actuates the print head drive at a column rate which reproduces normal spacing characters at a rate approximately matched to the code word input rate;

monitoring means, coupled to the input storage register, for detecting the number of code words in storage;

and selector logic means for selectively applying the print rate timing signals to the printer to control the rate of reproduction of spacing characters in accordance with a predetermined schedule correlating each print rate timing signal frequency with a given number of code words in storage at the beginning of each spacing character cycle.

12. A control system for controlling the print rate of a column-sequential dot matrix printer, according to claim 11, and further comprising:

carriage return detector means for detecting the completion of a carriage return in the printer;

and means, included in the selector logic means, for applying print rate timing signals of progressively increasing frequency to the printer for successive columns during at least one spacing character cycle following a carriage return, when the number of code words in storage exceeds a given minimum number $No$, to accelerate the print head gradually from the speed determined by the print rate timing signal of frequency $Fo$.

13. A control system for controlling the print rate of a column-sequential dot matrix printer, according to claim 12, in which the selector logic means further comprises means for interrupting acceleration of the print head at a cutoff speed determined by the number $N$ of code words in storage and having a maximum cufoff speed at a print rate timing frequency $Fc$ intermediate $Fn$ and $Fm$ for numbers $N$ less than an excessive number $Ne$ much greater than the number $Nn$ correlated to the frequency $Fn$.

14. A control system for controlling the print rate of a column-sequential dot matrix printer, according to claim 12, in which the schedule number $Nn$ of code words in storage correlated with the normal print rate timing signal of frequency $Fn$ substantially exceeds the minimum number $No$, so that a substantial number of code words are normally maintained in storage during extended operation of the pinter.

* * * * *